(12) United States Patent
Otsuka et al.

(10) Patent No.: US 7,188,956 B2
(45) Date of Patent: Mar. 13, 2007

(54) OPTICAL DEVICE AND REAR PROJECTOR

(75) Inventors: Nobutoshi Otsuka, Hotaka-machi (JP); Zenta Kosaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 10/950,473

(22) Filed: Sep. 28, 2004

(65) Prior Publication Data

US 2005/0094105 A1  May 5, 2005

(30) Foreign Application Priority Data

Oct. 7, 2003  (JP)  ............................. 2003-347916
Dec. 4, 2003  (JP)  ............................. 2003-405693

(51) Int. Cl.
*G03B 21/16* (2006.01)
*G03B 21/18* (2006.01)
*G03B 21/26* (2006.01)
*G02F 1/1333* (2006.01)

(52) U.S. Cl. ............................. 353/52; 353/54; 349/58; 349/161

(58) Field of Classification Search .................. 353/54, 353/119, 122, 100, 101; 359/288, 245; 349/58
See application file for complete search history.

(56) References Cited

U.S. PATENT DOCUMENTS 6,565,213 B1 * 5/2003 Yamaguchi et al. .......... 353/33
6,619,828 B2 * 9/2003 Montet et al. .............. 362/539
6,834,964 B2 * 12/2004 Nishihara et al. ............. 353/52
6,906,840 B1 * 6/2005 Fujimori et al. ............ 359/237
2002/0003704 A1 * 1/2002 Ohmae et al. .............. 362/293
2004/0032665 A1 * 2/2004 Fujimori et al. ............ 359/634

FOREIGN PATENT DOCUMENTS

JP  A 2000-298311  10/2000
JP  A 2003-066404  3/2003
JP  A 2003-149627  5/2003

* cited by examiner

*Primary Examiner*—Melissa Jan Koval
*Assistant Examiner*—Andrew Kong
(74) *Attorney, Agent, or Firm*—Oliff & Berridge, PLC

(57) ABSTRACT

A heat-conductive frame (448) is provided extending between a holder frame (446) and a fixing member (447) of an optical device (44). Additionally, a heat-conductive member (450) is provided, which abuts on a dust-proof glass on the light-irradiation side of a liquid crystal panel (440) and the fixing member (447). The holder frame (446) and the fixing member (447) are fixed by a heat-conductive agglutinate. Besides, a heat-conductive member (452) is attached extending between a light-irradiation surface of a transparent member (443A) of an irradiation-side polarization plate (443) and the fixing member (447). A heat-radiation fin (449) having a plurality of fin members (449B) is attached to an upper plate body (447C) of the fixing member (447).

20 Claims, 22 Drawing Sheets

OPTICAL DEVICE AND REAR PROJECTOR

BACKGROUND OF THE INVENTION

1. Field of the Invention

The present invention relates to an optical device and a rear projector.

2. Description of Related Art

There has been conventionally known a three-plate projector of front projection type in which a light beam irradiated by a light source is separated into three primary color lights of red, green and blue by a dichroic mirror, each color light is modulated by three liquid crystal panel (optical modulators) in accordance with image information, each modulated color light is combined by a color-combining optical device into a color image, and the color image is then projected on a front side of a screen in an enlarged manner through a projection lens.

On the other hand, there has been also known a rear projector in which a light beam irradiated by a light source is emitted to a liquid crystal panel (optical modulator) to be modulated in accordance with image information by the liquid crystal panel, the modulated light beam is combined by a color-combining optical device, the combined light beam is enlarged by a projection lens, and an optical path of the enlarged light beam is then converted by a reflection mirror to be guided to a rear side of a screen.

In such projectors described above, the optical modulator and a color-combining optical device are integrated as an optical device. In particular, it has been known an optical device in which the liquid crystal panel is joined and fixed on a light-incident surface of the color-combining optical device by interposing a wedge spacer or a pin spacer.

Incidentally, an optical element of the optical modulator or the like generates heat due to transmittance and absorption of the light beam, and consequently, the temperature of the optical element increases. Therefore, a cooling mechanism is typically applied thereto, in which a cooling medium such as the air is sent by a fan to directly cool the optical element itself (reference 1: JP2000-298311A, page 5, FIG. 5).

Recently, the luminance of such projectors has been increased, and accordingly, a cooling method for further efficiently cooling the optical element such as the optical modulator is required.

Though there is a conceivable method that the revolution of the fan for sending the cooling medium such as the air to enhance its cooling efficiency, this method may cause noise due to the revolution of the fan, thus not being able to reduce the noise.

SUMMARY OF THE INVENTION

An object of the present invention is to provide an optical device and a rear projector capable of decreasing noise and enhancing cooling efficiency.

An optical device according to an aspect of the present invention, includes: an optical modulator that modulates a light beam irradiated by a light source in accordance with image information; and a color-combining optical device that combines the optical image formed by the optical modulator, in which the optical modulator is housed in a holder frame having an opening formed corresponding to an image formation area of the optical modulator, the holder frame housing the optical modulator therein is fixed to a heat-conductive fixing member attached along a light-incident surface of the color-combining optical device, and a heat-radiation fin with platy fin members is provided on the fixing member.

The heat-conductive fixing member may be made of metal such as aluminum, copper or magnesium.

The optical device of the present invention may be installed either on a projector of front projection type, or on a rear projector.

According to the above aspect of the present invention, the holder frame in which the optical modulator is housed is fixed to the fixing member attached to the color-combining optical device. Therefore, the heat generated at the optical modulator is transmitted to the fixing member through the holder frame. The heat-radiation fin is provided at the fixing member and besides a heat-radiation area is largely assured, so that the heat transmitted to the fixing member can efficiently be radiated.

Thus, because the heat-radiation efficiency (cooling efficiency) of the optical modulator can be enhanced, the revolution of the fan for cooling the optical modulator is not necessary to be increased, thereby reducing the noise thereof.

Further, since the cooling ability of the fan for cooling the optical modulator can be lowered, an inexpensive cooling fan can be applied, thus decreasing the cost.

Furthermore, enhancing the cooling efficiency of the optical modulator allows lengthening the life span of the optical modulator.

Preferably, in the above the optical device, the heat-radiation fin and the fixing member may be integrally formed.

With this arrangement, by integrating the heat-radiation fin and the fixing member, the number of components can be prevented from increasing.

Preferably, in the above optical device, the heat-radiation fin may be detachably attached to the fixing member.

With this arrangement, since the heat-radiation fin is detachably attached to the fixing member, in the case that a plurality of optical modulators are provided according to the color lights of the light beam for instance, the heat-radiation fin can be attached, or alternatively detached according to the heat value of the optical modulator. For example, the heat-radiation fin may not be attached to the fixing member, to which the optical modulator for modulating red light with the least heat value is fixed. Thereby, the number of components can be reduced, and the cost of the optical device can be reduced.

Preferably, in the above optical device, the fin members of the heat-radiation fin may be treated by anti-reflection treatment so that the light beam will not be reflected.

For example, the anti-reflection treatment may be black-plating or black-aluminum coating on the fin members of the heat radiation fin.

With this arrangement, since the fin members of the heat-radiation fin is treated by the anti-reflection treatment, the light beam will not be reflected diffusely.

Additionally, the treatment of black-plating or black-aluminum coating as the anti-reflection treatment enhances the heat-radiating ability (emitting ability) of the heat-radiation fin.

Preferably, in the above optical device, a cooling fluid may be flown to the optical modulator, and a direction in which the fin members of the heat-radiation fin are arranged may incline against a path of the cooling fluid by approximately 45 degrees.

With this arrangement, since the arrangement of the fin members of the heat-radiation fin inclines against the path of the cooling fluid by approximately 45 degrees, the cooling fluid can easily be flown to the surface of the fin members of the heat-radiation fin, thus enhancing the cooling efficiency of the heat-radiation fin.

Preferably, in the above optical device, a heat-conductive member may be provided extending between the holder frame and the fixing member by abutting on both of them.

With this arrangement, since the heat-conductive member is provided extending between the holder frame and the fixing member, the heat transmitted from the optical modulator to the holder frame can efficiently be transmitted to the fixing member via the heat-conductive member. Thereby, the heat-radiation efficiency of the optical modulator can be enhanced.

An optical device according to another aspect of the present invention, includes: an optical modulator that modulates a light beam irradiated by a light source in accordance with image information; and a color-combining optical device that combines the optical image formed by the optical modulator, in which the optical modulator is housed in a holder frame having an opening formed corresponding to an image formation area of the optical modulator, the holder frame housing the optical modulator is housed therein is fixed to a heat-conductive fixing member attached along a light-incident surface of the color-combining optical system, and a heat-conductive member is provided extending between the holder frame and the fixing member by abutting on both of them.

According to the above aspect of the present invention, the holder frame in which the optical modulator is housed is fixed to the fixing member attached to the color-combining optical device. Additionally, since the heat-conductive member is provided extending between the holder frame and the fixing member, the heat generated at the optical modulator is transmitted to the fixing member through the holder frame and the heat-conductive member. Thus, because the heat-radiation efficiency (cooling efficiency) of the optical modulator can be enhanced, the revolution of the cooling fan for cooling the optical modulator is not necessary to be increased, accordingly reducing the noise thereof.

Further, since the cooling ability of the fan for cooling the optical modulator can be lowered, an inexpensive cooling fan can be applied, thus decreasing the cost.

Furthermore, enhancing the cooling efficiency of the optical modulator allows lengthening the life span of the optical modulator.

Preferably, in the above optical device, a heat-radiation fin may be formed at the heat-conductive member.

With this arrangement, since the heat-radiation fin is formed at the heat-conductive member disposed extending between the holder frame and the fixing member, the surface area of the heat-conductive member can largely be assured, thus radiating the heat efficiently from the heat-conductive member. Therefore, the heat is prevented from staying at the fixing member, accordingly further enhancing the heat-radiation efficiency of the optical modulator.

Preferably, in the above optical device, the holder frame housing the optical modulator therein and the fixing member may be bonded by a heat-conductive bonding agent.

The heat-conductive agglutinate may be a heat-conductive adhesive or solder.

With this arrangement, since the holder frame and the fixing member is bonded by the heat-conductive agglutinate, the heat generated at the optical modulator is transmitted to the holder frame, and the heat transmitted to the holder frame is then transmitted to the fixing member through the heat-conductive agglutinate. Accordingly, the heat can efficiently be conducted between the holder frame and the fixing member, thus enhancing the heat-radiation efficiency (cooling efficiency) of the optical modulator.

Preferably, in the above optical device, a heat-conductive member may be provided between a light-irradiation surface of the optical modulator and the fixing member by abutting on both of them.

With this arrangement, the heat at the light-irradiation surface of the optical modulator can efficiently be transmitted to the fixing member through the heat-conductive member, so that the heat-radiation efficiency of the optical modulator can be enhanced.

Preferably, the above optical device, may further include: an optical conversion plate disposed between a light-incident surface of the color-combining optical device and a light-irradiation surface of the fixing member, in which the optical conversion plate may include a transparent member made of heat-conductive material, and an optical conversion film attached on the transparent member to convert optical characteristics of the light beam irradiated by the optical modulator, and in which a light-incident surface of the transparent member and the light-irradiation surface of the fixing member may be fixed by interposing a heat-conductive member therebetween.

Here the heat-conductive member may be, for instance, a heat-conductive both sided tape, a heat-conductive sheet or silicon grease.

Typically, heat is generated at the optical conversion film of the optical conversion plate due to transmittance of the light beam. With this arrangement, since the light-incident surface of the transparent member of the optical conversion plate and the fixing member are fixed via the heat-conductive member, the heat generated at the optical conversion film can efficiently be transmitted from the transparent member to the fixing member. Thereby, the heat of the optical conversion plate can efficiently be radiated.

As described above, because the heat-radiation efficiency of the optical conversion plate can be enhanced, the transparent member of the optical conversion plate can be the one with the heat-conductivity is relatively low. For example, the transparent member can be made of crystal instead of sapphire, thus reducing the cost of the optical conversion plate.

Preferably, the above optical device, may further includes: an optical conversion plate disposed between a light-incident surface of the color-combining optical device and a light-irradiation surface of the fixing member, in which the optical conversion plate may include a transparent member made of heat-conductive material, and an optical conversion film attached on the transparent member to convert optical characteristics of the light beam irradiated by the optical modulator, and in which a heat-conductive member may be provided extending between a light-irradiation surface of the transparent member and the fixing member by abutting on both of them.

Since the heat-conductive member is provided extending between the light-irradiation surface of the transparent member of the optical conversion plate and the fixing member, the heat transmitted to the light-irradiation surface of the transparent member can efficiently be transmitted to the fixing member. Further, as described above, since the heat-radiation fin is formed on the fixing member according to this arrangement, the heat transmitted to the fixing member can efficiently be radiated.

According to this arrangement, not only the heat generated at the optical modulator, but also the heat generated at the optical conversion plate can be radiated from the fixing member, thus enhancing the heat-radiation efficiency of the optical conversion plate.

A rear projector according to still another aspect of the present invention, includes: an optical device that modulates a light beam irradiated by a light source to form an optical image in accordance with image information; an image formation section including a projection optical system that projects the optical image in an enlarged manner; a boxy casing for housing the image formation section; and a screen provided on the casing in an exposed manner, on which the optical image formed by the image formation section is projected. The optical device is one of the above-described optical devices.

Since the rear projector of the above aspect of the present invention has the above-described optical device, the same advantages as the optical device can be obtained.

Preferably, the above rear projector, may further includes: an optical conversion plate having an optical conversion film that converts optical characteristics of the light beam entering the optical modulator of the optical device and a transparent member, on which the optical conversion film is attached; and an optical component casing housing the optical device and the optical conversion plate therein, in which a heat-radiation fin with a plurality of platy fin members may be provided on a heat-conductive fixing member, by which the optical conversion plate is fixed to the optical component casing.

With this arrangement, the optical conversion plate is fixed to the heat-conductive fixing member, so that the heat of the optical conversion plate that converts optical characteristics of the light beam incident on the optical modulator is transmitted to the fixing member.

Additionally, since the heat-radiation fin is provided on the fixing member and thus a heat-radiation area is largely assured, the heat transmitted to the fixing member can efficiently be radiated. Thereby, the heat-radiation efficiency of the optical conversion plate that converts optical characteristics of the light beam incident on the optical modulator can be enhanced.

DETAILED DESCRIPTION OF PREFERRED EMBODIMENT(S)

Embodiments of the present invention will be described below with reference to the attached drawings.

[First Embodiment]

[1. Configuration of Projection Television]

Figure 1:
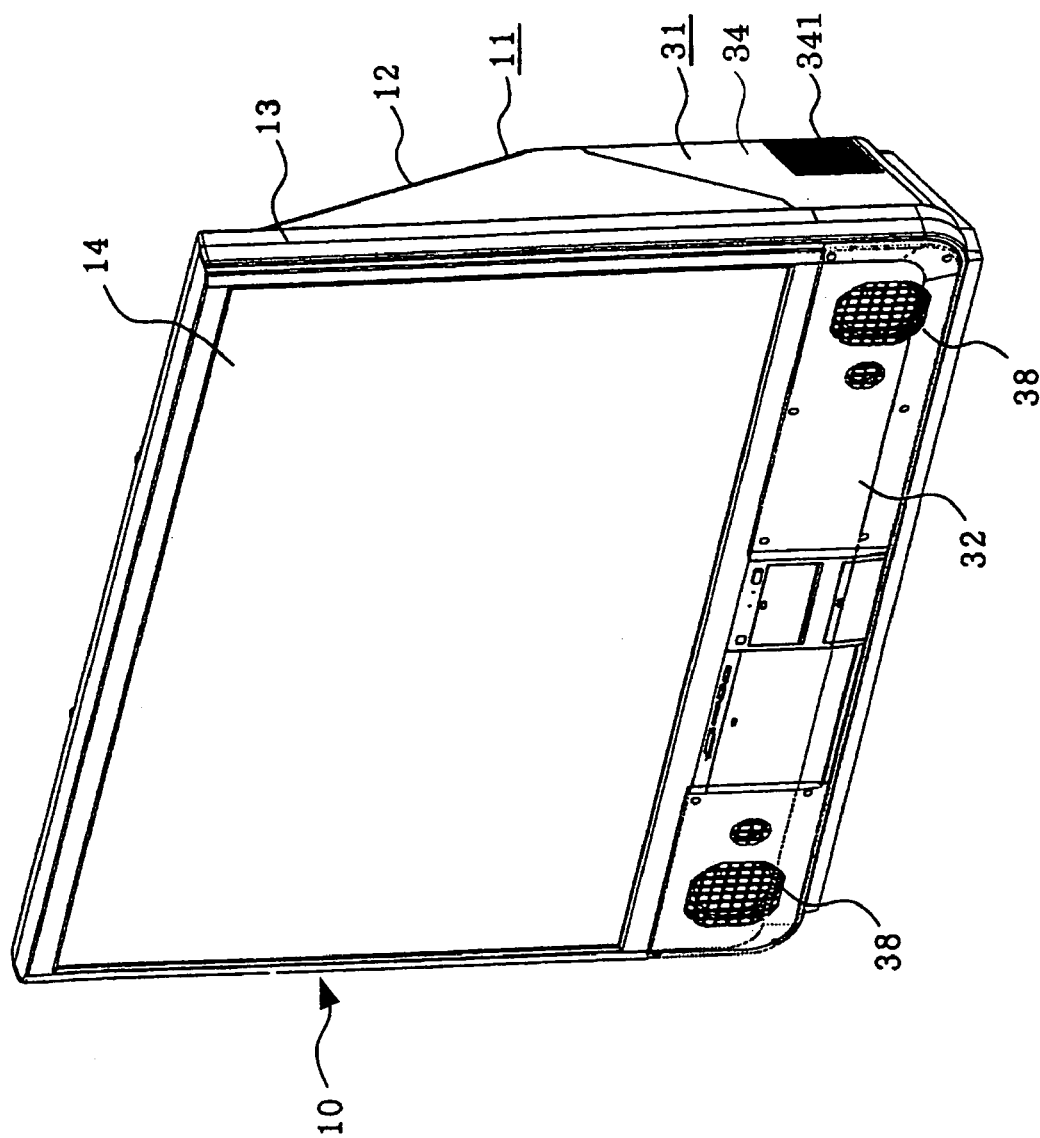
FIG. 1 is a perspective view showing the front side of a projection television as a rear projector according to a first embodiment.

FIG. 1 is a perspective view showing the front side of a projection television 10 as a rear projector.

Figure 2:
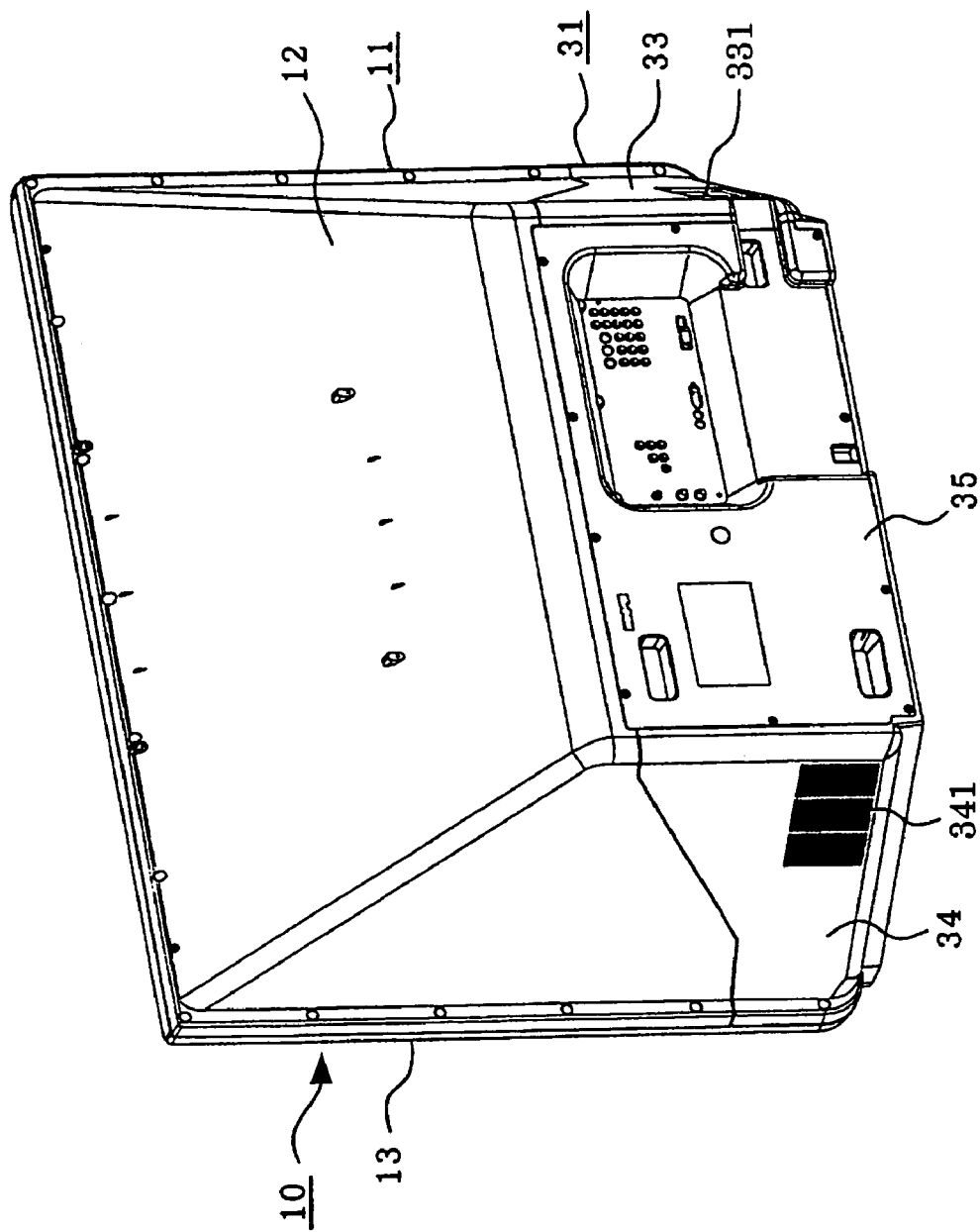
FIG. 2 is a perspective view showing the rear side of the projection television of the aforesaid embodiment.

FIG. 2 is a perspective view showing the rear side of the projection television 10.

Figure 3:
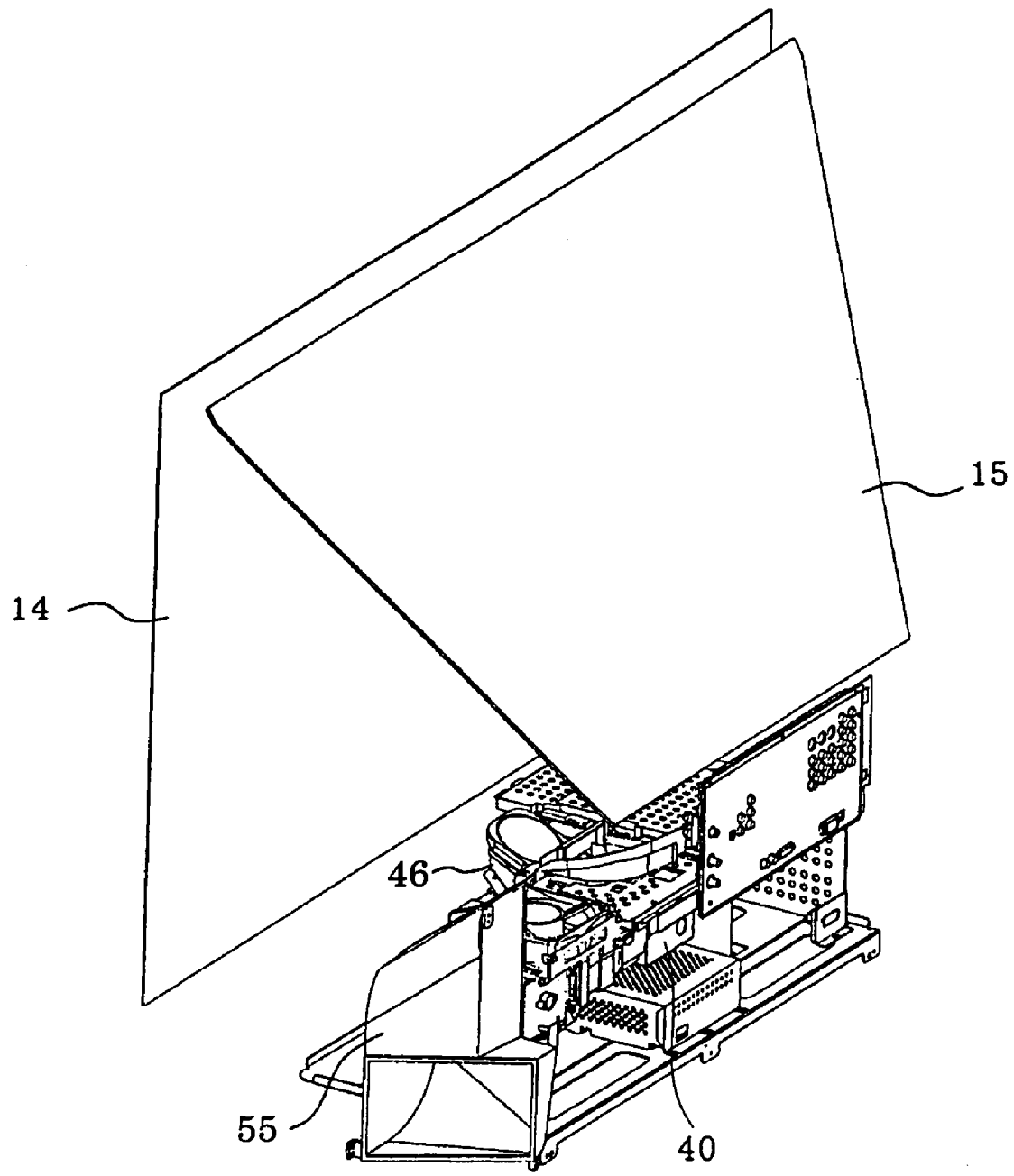
FIG. 3 is an illustration showing the inner structure of the projection television of the aforesaid embodiment.

FIG. 3 is an illustration showing the inner structure of the projection television 10.

The projection television 10 modulates a light beam irradiated by a light source in accordance with image information to form an optical image, and projects the optical image on a screen in an enlarged manner. As shown in FIGS. 1 to 3, the projection television 10 mainly consists of an upper cabinet 11 and a lower cabinet 31 as casings (FIGS. 1 and 2), a screen 14 (FIG. 1) provided on the front side of the upper cabinet 11 in an exposed manner, a mirror 15 (FIG. 3) disposed inside the upper cabinet 11, and an optical unit 40 (FIG. 3) as an image forming section arranged inside the lower cabinet 31. Though the projection television 10 will not be described more in detail other than the above-described configuration, the projection television 10 also includes other components such as a power source device for supplying electric power from the outside to the optical unit 40 and the like, and a control board that, for instance, controllably drives the optical unit 40 in accordance with the image information input from the outside.

[1-1. Configuration of Cabinet]

As shown in FIGS. 1 and 2, the exterior of the projection television 10 is formed by the upper cabinet 11 and the lower cabinet 31, the upper cabinet 11 and the lower cabinet 31 being separable.

As shown in FIGS. 1 and 2, the upper cabinet 11 is a casing having a triangle cross-section for housing the mirror 15 (FIG. 3), the upper cabinet 11 including a mirror case 12 with the mirror 15 (FIG. 3) being attached, and a screen frame 13 formed around the front opening of the mirror case 12, the screen frame 13 being attached to the screen 14.

Figure 4:
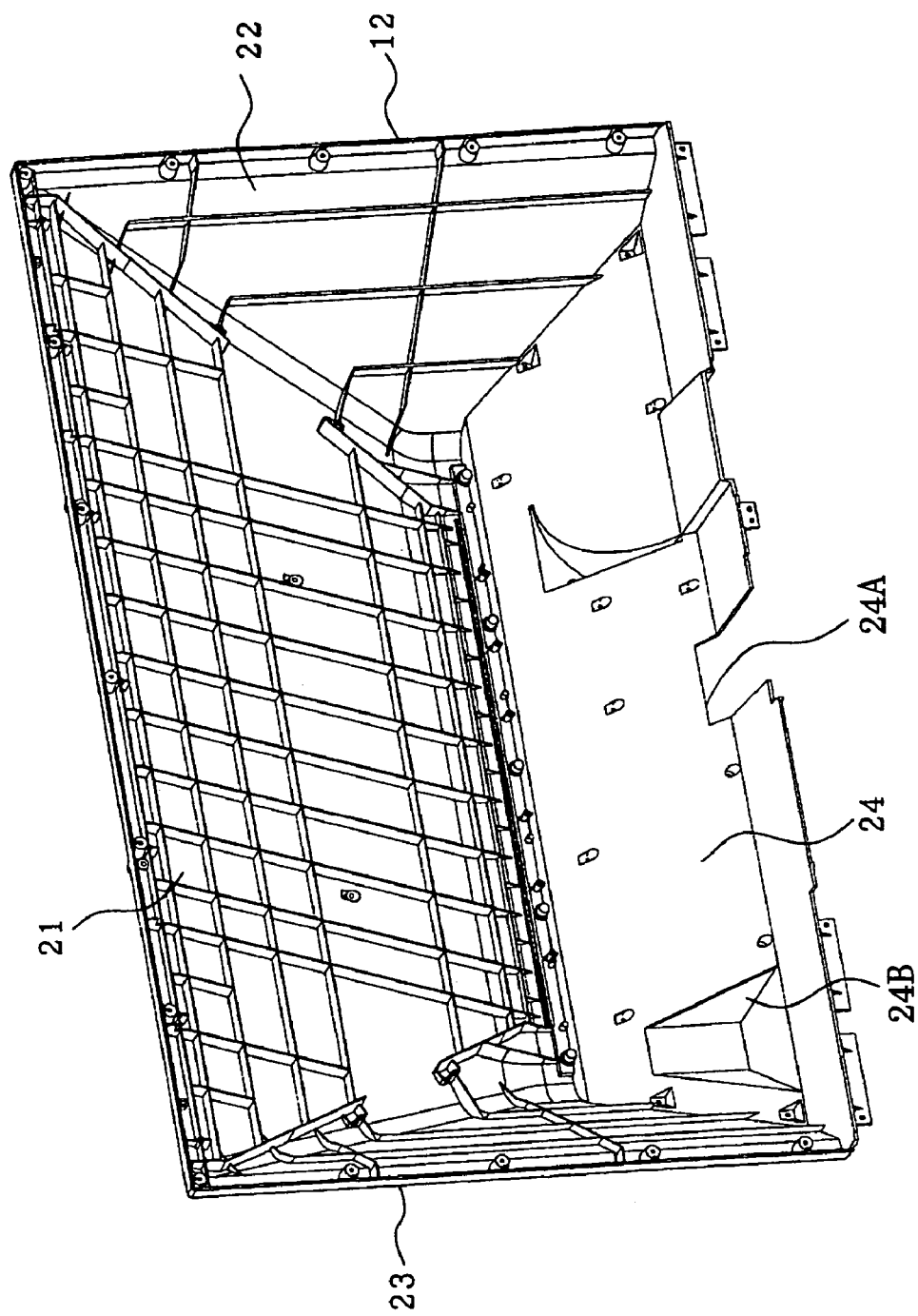
FIG. 4 is a perspective view showing the front side of a mirror case of the aforesaid embodiment.

FIG. 4 is a perspective view showing the front side of the mirror case 12.

As shown in FIG. 4, the mirror case 12 consists of a rear wall 21, a pair of side walls 22 and 23, and a bottom wall 24.

The rear wall 21, which is trapezoidal in plan view with its longer side being upside, inclines toward the rear lower side to support the mirror 15 (FIG. 3) by the inner surface thereof by a predetermined angle.

The pair of side walls 22 and 23, each of which is a triangle shape in plan view, project from the both edges of the rear wall 21 to the front side and increasingly incline toward the inner side as the side walls 22 and 23 approach the rear side.

The bottom wall 24 formed extending between the pair of side walls 22 and 23 is a trapezoidal shape in plan view with its longer side locating on the front side, the bottom wall 24 inclining toward the rear upper side. The bottom wall 24 has a cut portion 24A at the substantially center on the front side, and an opening 24B on the light side as seen from the front side.

The screen frame 13 formed in a rectangular frame holds the screen 14 at a predetermined position by the inner surface thereof, the screen frame 13 being fixed to the front edge of the mirror case 12 with the use of screws or the like.

Figure 5:
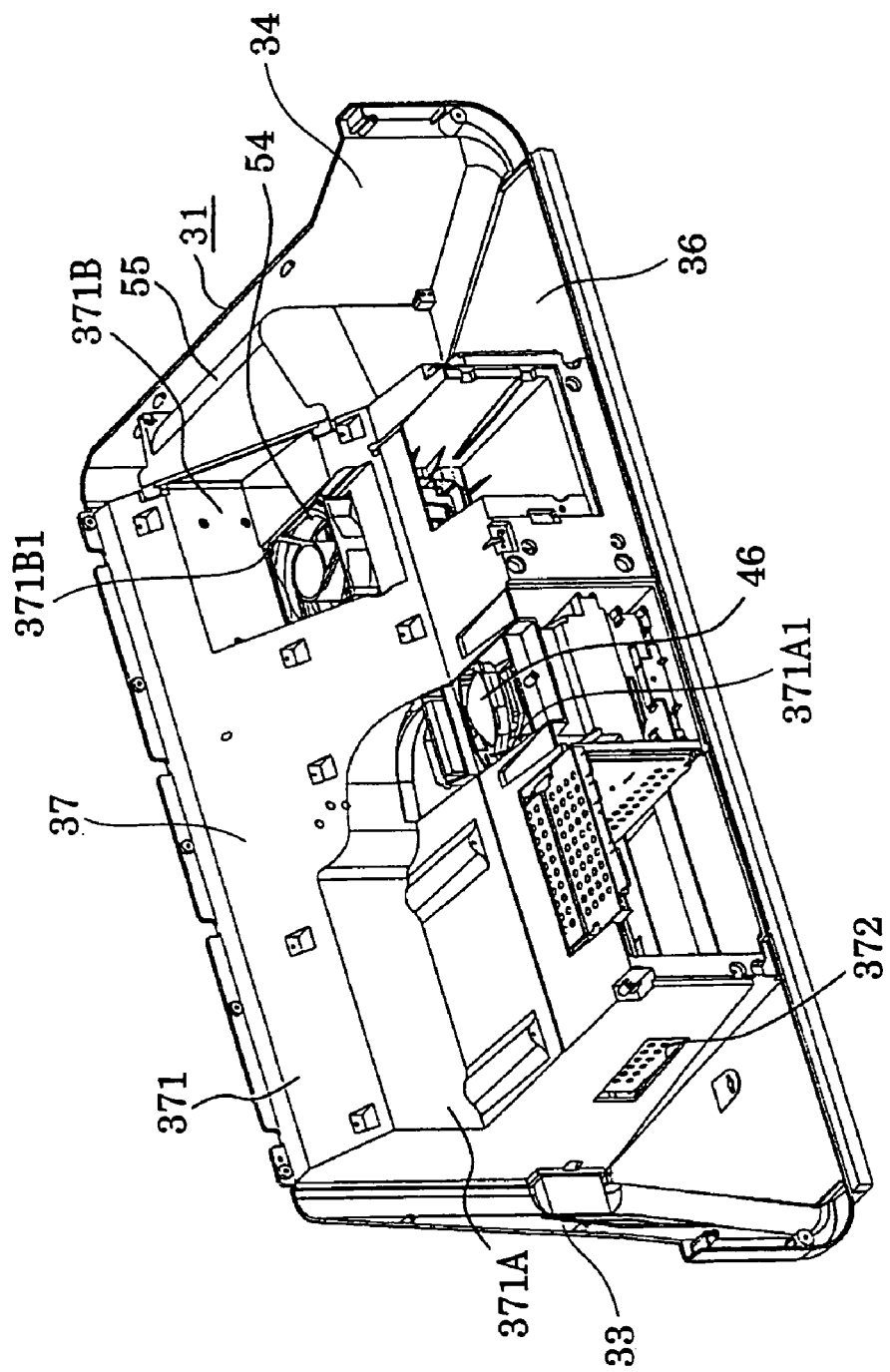
FIG. 5 is a perspective view showing the front side of a lower cabinet of the aforesaid embodiment.

FIG. 5 is a perspective view showing the front side of the lower cabinet 31.

The lower cabinet 31 is a casing for housing the optical unit 40, the power source device not shown, the control board not shown and the like, which consists of a front panel 32 (FIG. 1), side panels 33 and 34 (FIG. 2), a rear panel 35 (FIG. 2), a bottom side 36 and a setting portion 37 attached to the bottom side 36 for positioning the optical unit 40, the power source device, the control board and the like at predetermined positions in the lower cabinet 31.

As shown in FIG. 1, the front panel 32 is rectangular in plan view with rectangular openings 38 provided on the left and right sides, the dimensions thereof being the substantially same with each other. Additionally, speakers (not shown) are respectively arranged inside the openings 38.

As shown in FIG. 2, the side panels 33 and 34, which are trapezoidal in plan view, increasingly incline toward the inner side as the side panels 33 and 34 approach the rear side. Besides, slit-like openings are respectively provided on the side panels 33 and 34. The opening formed on the side panel 33 is a suction port 331 (FIG. 2) for introducing cooling air to the inside, while the opening formed on the side panel 34 is an exhaust port 341 (FIG. 2) for discharging the air having introduced to and cooled the inside.

As shown in FIG. 2, the rear panel 35 is rectangular in plan view and provided with various types of terminals for connecting equipments such as a connector for connecting a computer, a video input terminal, a terminal for connecting an audio equipment.

As shown in FIG. 5, the bottom side 36 is rectangular in plan view, which entirely supports the projection television 10.

The setting portion 37 surrounds the respective devices arranged in the lower cabinet 31, and appropriately divides the respective devices.

In the setting portion 37, an upper side 371 inclines toward the upper rear side corresponding to the bottom wall 24 of the upper cabinet 11. Additionally, the upper side 371 has steps 371A and 371B respectively formed on the location between the substantially center part to the left side part as seen from the front side, and on the right side part as seen from the front side.

In the step 371A, a cut portion 371A1 is formed on the right side part, the cut portion 371A1 being located above an optical device (described later) of the optical unit 40 (FIG. 3) disposed in the setting portion 37, and the cut portion 371A1 is so formed that a projection lens (described later) of the optical unit 40 (FIG. 3) disposed in the setting portion 37 is exposed therefrom.

In the step 371B, a cut portion 371B1 is formed on the bottom side part thereof, the cut portion 371B1 facing to a discharge hole of an exhaust fan 54 attached on the light source device (described later) of the optical unit 40 (FIG. 3) disposed in the setting portion 37.

Additionally, in the step 371B, the suction side of a duct 55, which connects the exhaust port 341 (FIG. 2) formed on the side panel 34, is connected to the right side part of the step 371B as seen from the front side.

As shown in FIG. 5, a hole 372 for circulating the air inside the setting portion 37 is formed on the left side of the setting portion 37 as seen from the front side. The hole 372 communicates the light source device (described later) of the optical unit 40 (FIG. 3) so as to circulate the air to the light source device.

Figure 6:
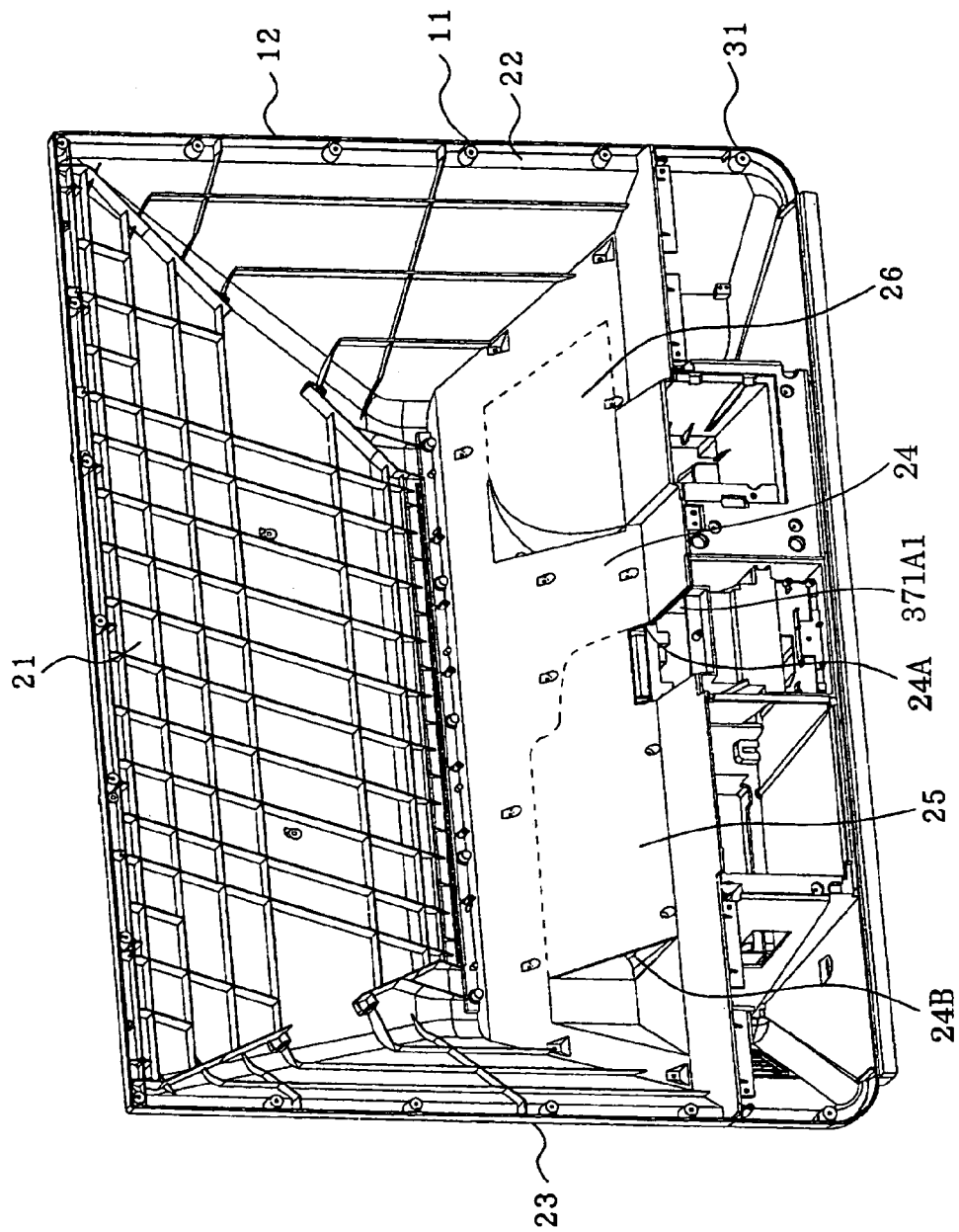
FIG. 6 is an illustration in which an upper cabinet (the mirror case) shown in FIG. 4 is assembled with the lower cabinet 31 shown in FIG. 5.

FIG. 6 is an illustration in which the upper cabinet 11 shown in FIG. 4 is assembled with the lower cabinet 31 shown in FIG. 5.

As shown in FIG. 6, when the upper cabinet 11 is combined with the lower cabinet 31, a duct 25 is formed by the bottom wall 24 of the mirror case 12 and the step 371A formed on the upper side 371 of the setting portion 37 of the lower cabinet 31, while a duct 26 is formed by the bottom wall 24 and the step 371B. The suction side of the duct 25 faces to the upper part side of the optical device (described later) of the optical unit 40 (FIG. 3) disposed in the lower cabinet 31 through the cut portion 371A1 of the upper side 371. On the other hand, the suction side of the duct 26 faces to the discharge hole of the exhaust fan 54 through the cut portion 371B1 (FIG. 5) of the upper side 371.

Further, when the upper cabinet 11 is assembled with the lower cabinet 31, the cut portion 24A of the upper cabinet 11 faces to the cut portion 371A1 of the lower cabinet 31, so that an optical path of video picture projected from the projection lens (described later) of the optical unit 40 (FIG. 3) disposed in the lower cabinet 31 toward the mirror 15 is formed.

[1-2. Configuration of Screen]

The screen 14 is a light transmitting screen in which an optical image enlarged by the projection lens (described later) of the optical unit 40 and then reflected by the mirror 15 is projected from the backside of the screen. As shown in FIG. 1, the screen 14 is attached on the front side of the mirror case 12 with the use of the screen frame 13 of the upper cabinet 11.

The screen 14 can consist of, for example, a diffusion plate, a fresnel sheet, a lenticular sheet, a protection plate and the like. The light beam irradiated by the projection lens and reflected by the mirror 15 is diffused by the diffusion plate, parallelized by the fresnel sheet, and then diffused by optical beads of the renticular sheet so as to obtain a display image.

[1-3. Configuration of Mirror]

As shown in FIG. 3, the mirror 15 is a typical mirror formed in a trapezoidal shape in plan view and attached to the inner side of the rear wall 21 of the upper cabinet 11 in an inclined manner that the longer side of the trapezoidal shape is the upper side. The inclination of the mirror 15 is set according to a positional relationship between the screen 14 on the front side and the reflection of the video picture by way of the projection lens (described later) of the optical unit 40.

[1-4. Configuration of Optical Unit]

Figure 7:
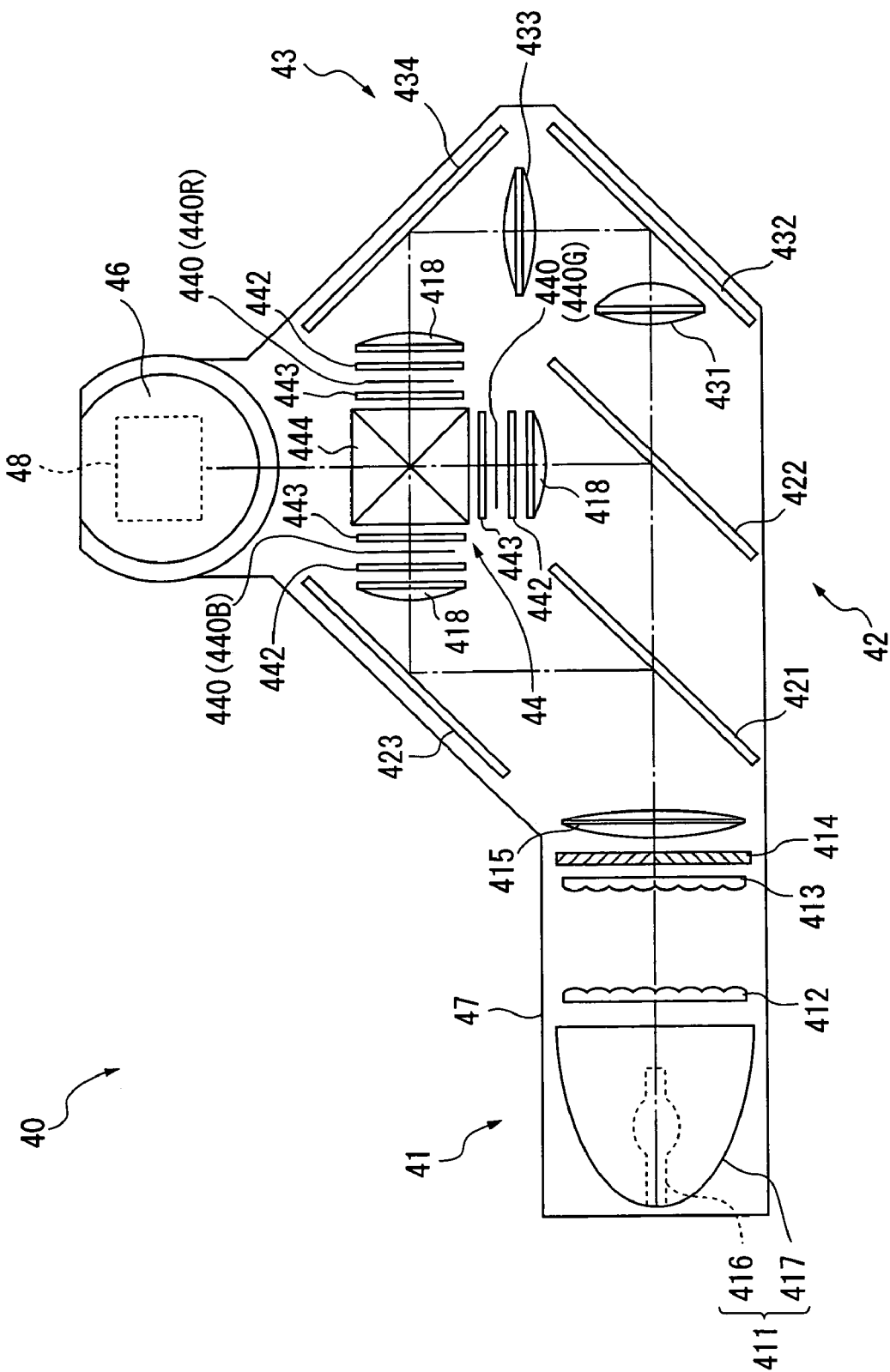
FIG. 7 is a schematic illustration showing an optical unit of the aforesaid embodiment.

FIG. 7 is a schematic illustration showing the optical unit 40.

The optical unit 40 is a unit that optically processes the light beam irradiated by the light source lamp of the light source device to form an optical image in accordance with image information and projects the optical image in an enlarged manner.

As shown in FIG. 7, the optical unit 40 includes an integrator illuminating optical system 41, a color-separating optical system 42, a relay optical system 43, an optical device 44, a prism 48, a projection lens 46 as a projection optical device, and a light guide 47.

The integrator illuminating optical system 41 is an optical system for substantially uniformly illuminating image formation areas of three optical modulators (liquid crystal panels) described later of the optical device 44. The integrator illuminating optical system 41 has a light source device 411, a first lens array 412, a second lens array 413, a polarization converter 414 and a superposing lens 415.

The light source device 411 has a light source lamp 416 (radial light source) and a reflector 417. A radial light beam irradiated by the light source lamp 416 is reflected by the reflector 417 to be a parallel light beam, and the parallel light beam is irradiated to the outside.

A high-pressure mercury lamp is used for the light source lamp 416. Incidentally, the light source lamp 416 may not be the high-pressure mercury lamp but may be a metal halide lamp or a halogen lamp.

A parabolic mirror is used for the reflector 417. Incidentally, a combination of a parallelizing concave lens and an ellipsoidal mirror may be used instead of the parabolic mirror.

The first lens array 412 has small lenses arranged in a matrix, the lenses having substantially rectangular profile as seen in an illumination optical axis direction, the respective lenses separating the light beam irradiated by the light source lamp 416 into a plurality of sub-beams.

The second lens array 413 is arranged approximately in the same manner as the first lens array 412, which includes small lenses arranged in a matrix. The second lens array 413 focuses the image of the small lenses of the first lens array 412 onto the liquid crystal panels (described later) together with the superposing lens 415.

The polarization converter 414 is disposed between the second lens array 413 and the superposing lens 415 (but not integrated). The polarization converter 414 converts the light from the second lens array 413 into a substantially uniform polarized light, thereby enhancing the light utilization efficiency of the optical device 44.

Specifically, the respective sub-beams converted into the substantially uniform polarized light by the polarization converter 414 is substantially superposed on the liquid crystal panels (described later) of the optical device 44 by the superposing lens 415 finally. Since only one-type of polarized light can be used in the projection television 10 using the liquid crystal panels that modulate polarized light, approximately half of the light beam from the light source lamp 416 emitting random polarized light cannot be used. Accordingly, with the use of the polarization converter 414, the light beam irradiated by the light source lamp 416 is converted into the substantially uniform polarized light to enhance the light utilization efficiency of the optical device 44.

Incidentally, such polarization converter 414 is disclosed in, for instance, JP Hei 8-304739A.

The color-separating optical system 42 has two dichroic mirrors 421 and 422, and a reflection mirror 423, which separates the plurality of sub-beams irradiated from the integrator illuminating optical system 41 by the dichroic mirrors 421 and 422 into three color lights of red (R), green (G) and blue (B).

The relay optical system 43 has an incident-side lens 431, a relay lens 433 and reflection mirrors 432 and 434, which guides red light separated by the color-separating optical system 42 to the liquid crystal panel for red light (described later) of the optical device 44.

At this time, the dichroic mirror 421 of the color-separating optical system 42 transmits the red light component and green light component of the light beam irradiated by the integrator illuminating optical system 41 and reflects the blue light component. The blue light reflected by the dichroic mirror 421 is reflected by the reflection mirror 423, which reaches to the liquid crystal panel for blue light (described later) of the optical device 44 through the field lens 418. The field lens 418 converts the respective sub-beams irradiated by the second lens array 413 into a light beam parallel to the central axis (main beam) thereof. The field lenses 418 provided on the light-incident side of other liquid crystal panels for green light and red light function in the same manner.

In the red and green lights passed through the dichroic mirror 421, the green light is reflected by the dichroic mirror 422, which reaches to the liquid crystal panel for green light through the field lens 418. On the other hand, the red light passes through the dichroic mirror 422, which passes through the relay optical system 43 to reach the liquid crystal panel for red light through the field lens 418.

Incidentally, the relay optical system 43 is used for the red light in order to avoid deterioration in the light utilization efficiency on account of light dispersion and the like caused by the longer length of the optical path of the red light than the optical paths of other color lights. In other words, the relay optical system 43 is used for directly transmitting the sub-beams incident on the incident-side lens 431 to the field lens 418. Note that, though the red light of the three color lights passes through the relay optical system 43, the blue light, for instance, may alternatively pass through the relay optical system 43.

The optical device 44 modulates the light beam incident thereon in accordance with image information to form a color image, which includes three incident-side polarization plates 442 on which the respective color lights separated by the color-separating optical system 42 enter, the three optical modulators (liquid crystal panels) 440 (440R, 440G and 440B) disposed on the downstream of the respective incident-side polarization plates 442, three irradiation-side polarization plates 443 disposed on the downstream of the respective liquid crystal panels 440, and a cross dichroic prism 444 (color-combining optical system). The incident-side polarization plates 442, the liquid crystal panels 440, the irradiation-side polarization plates 443 and the cross dichroic prism 444 are integrated as a unit.

The liquid crystal panel 440 use, for instance, polycrystalline silicon TFT as a switching element. The respective color lights separated by the color-separating optical system 42 are modulated in accordance with image information to form an optical image with the use of the three liquid crystal panels 440, the incident-side polarization plates 442 on the light-incident side, and the irradiation-side polarization plates 443 on the light-irradiation side.

The incident-side polarization plates 442 as optical conversion plates transmits a polarized light in a predetermined direction out of the respective color lights separated by the color-separating optical system 42 and absorb the other light beams, each of which has a transparent member (substrate) 442A (see FIG. 13) made of crystal or the like with a polarization film (optical conversion film) attached thereon.

Figure 9:
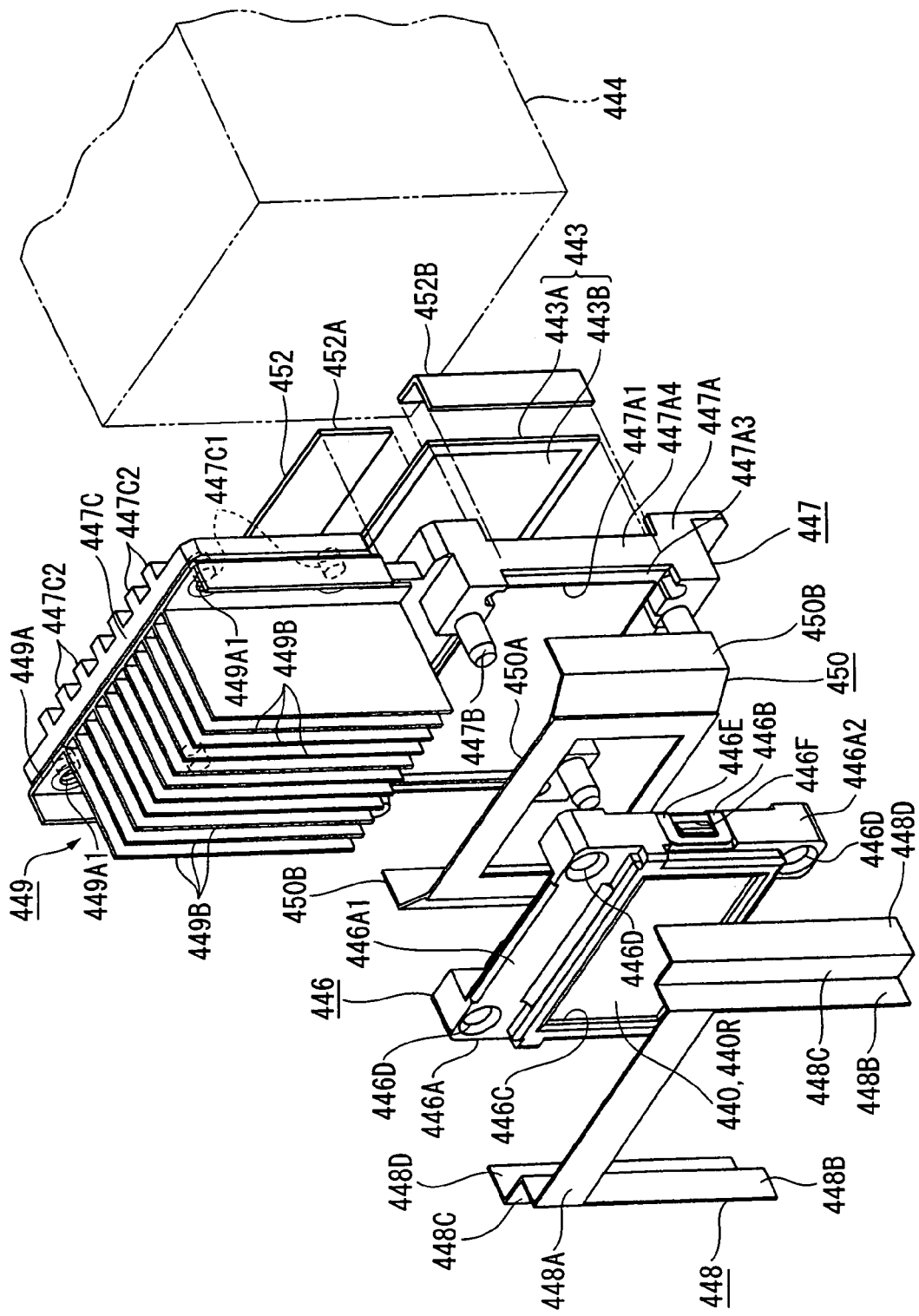
FIG. 9 is an exploded perspective view showing the structure of the optical device of the aforesaid embodiment.

The irradiation-side polarization plates 443 as optical conversion plates are configured substantially in the same manner as the incident-side polarization plates 442, with a polarization film (optically conversion film) 443B (not shown) attached on each of transparent members 443A (see FIG. 9). The polarization film 443B only transmits a polarized light beam in a predetermined direction out of the light beams irradiated from the liquid crystal panels 440 and absorbs other light beams.

The incident-side polarization plates 442 and the irradiation-side polarization plates 443 are arranged so that the directions of the polarization axes thereof are orthogonal with each other.

The cross dichroic prism 444 combines the optical image irradiated by the irradiation-side polarization plates 443 and modulated for each color light to form a color image.

In the cross dichroic prism 444, a dielectric multi-layer film for reflecting the red light and a dielectric multi-layer film for reflecting the blue light are formed along the boundaries of four right-angle prisms approximately in X-shape, the dielectric multi-layer films combining the three color lights.

Incidentally, the detailed configuration of the optical device 44 will be described below.

The prism 48 is disposed on the light-irradiation side of the optical device 44, which bends and reflects the color image formed by the optical device 44 to the projection lens 46, in other words, the color image irradiated in the front direction, toward the upper direction.

The projection lens 46 projects the color image reflected by the prism 48 to the mirror 15 in an enlarged manner. The projection lens 46 is a lens set housing a plurality of lenses in a lens barrel.

The light guide 47 is made of synthetic resin, which houses and holds the above-described optical systems 41 to 44 and 48. Though not illustrated in detail, the light guide 47 has a lower light guide with grooves formed to which the respective optical components 412 to 415, 418, 421 to 423 and 431 to 434 are fitted by sliding them, and a lid-shaped upper light guide for closing the upper opening of the lower light guide.

[1-5. Structure of Optical Device]

The structure of the optical device 44 is described below with reference to FIGS. 8 to 13.

Figure 8:
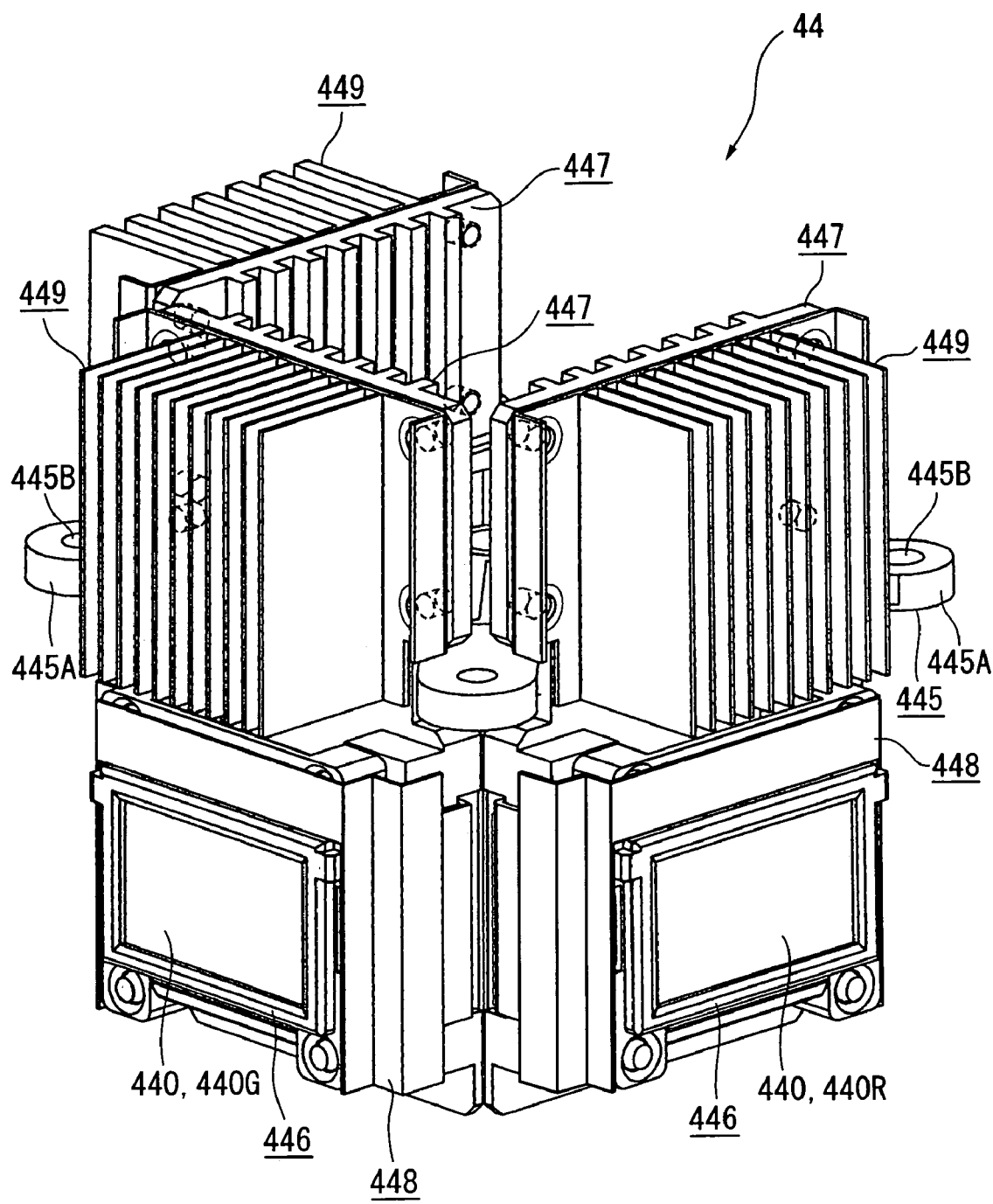
FIG. 8 is a perspective view showing the structure of an optical device of the aforesaid embodiment.

As shown in FIGS. 8 and 9, the optical device 44 further includes a base 445, holder frames 446 and fixing members 447 in addition to the above-described liquid crystal panels 440, the incident-side polarization plates 442, the irradiation-side polarization plates 443 and the cross dichroic prism 444.

The holder frame 446 houses the liquid crystal panel 440, which is integrally fixed on a light-incident surface of the cross dichroic prism 444 through the fixing member 447. Though described below in detail, the incident-side polarization plate 442 is fixed on the light guide 47.

The base 445 is fixed on the upper side of the cross dichroic prism 444, to fix the integrated optical device 44 on the lower light guide of the light guide 47. The base 445 is a substantially rectangular plate component provided with extended portions 445A respectively extended from the four corners of the base 445. A hole 445B is formed on each end of the extended portions 445A. Besides, the rectangular part of the base 445 is formed somewhat smaller than the periphery of the cross dichroic prism 444. Therefore, when the fixing members 447 are fixed on the lateral sides of the cross dichroic prism 444, the base 445 and the fixing members 447 are not interfered with each other.

The holder frame 446 houses the liquid crystal panel 440.

Describing the liquid crystal panel 440 more in detail, the liquid crystal panel 440 uses, for instance, a polycrystalline silicon TFT (Thin Film Transistor) as a switching element, which has a pair of opposing transparent substrates with liquid crystal sealed therebetween. Additionally, dust-proof glasses are respectively attached on the light-incident side and the light-irradiation side of the pair of the transparent boards.

The holder frame 446 has a recessed frame 446A having a housing section in which the liquid crystal panel 440 is housed, and a support plate 446B engaged with the recessed frame 446A for pressing and fixing the housed liquid crystal panel 440. Further, an opening 446C is provided on the holder frame 446 at the position corresponding to the panel surface of the housed liquid crystal panel 440. Furthermore, holes 446D are formed on the four corners of the holder frame 446. The recessed frame 446A and the support plate 446B are fixed by engaging hooks 446E provided on the left and right sides of the support plate 446B with hook engaging portions 446F provided on the recessed frame 446A at the positions corresponding to the hooks 446E.

Here, the liquid crystal panel 440 exposed from the opening 446C of the holder frame 446, the exposed part defining the image formation area. In other words, the respective color lights R, G and B are introduced to the exposed parts of the liquid crystal panels 440 to form an optical image in accordance with image information.

A heat-conductive frame 448 is attached extending among a light-incident surface 446A1 and lateral sides 446A2 of the recessed frame 446A of the holder frame 446; and a light-incident surface 447A3 and lateral sides 447A4 of the fixing member 447.

The frame 448 is a substantially U-shape in plan view seen from the light-incident side of the optical device 44, which is configured not to disturb the opening 446C of the holder frame 446. Specifically, the frame 448 has a first abutting portion 448A abutted on the upper part of the light-incident surface 446A1 of the holder frame 446, second abutting portions 448B orthogonal to the both ends of the first abutting portion 448A and abutting on the lateral sides 446A2 of the holder frame 446, third abutting portions 448C orthogonal to the second abutting portions 448B and abutting on the light-incident surface 447A3 of the fixing member 447, and fourth abutting portions 448D orthogonal to the third abutting portions 448C and abutting on the lateral sides 447A4 of the fixing member 447.

Actually, since extended portions 450B of a below-described heat-conductive member 450 and second and third heat-conductive members 452B and 452C of a heat-conductive member 452 are attached to the lateral sides 447A4 of the fixing member 447, the fourth abutting portions 448D abut on the lateral sides 447A4 of the fixing member 447 by interposing the extended portions 450B as well as the second and third heat-conductive members 452B and 452C of the heat-conductive member 452.

Heat-conductive material used for such frame 448 may be a graphite sheet, a copper plate, a copper foil or an aluminum foil. The graphite sheet is the most preferable to use among them. The graphite sheet can enhance adhesiveness to the holder frame 446 and the fixing member 447 due to its flexibility. The graphite sheet can also enhance heat-conductivity from the holder frame 446 to the fixing member 447 since contact thermal resistance of the graphite sheet is extremely low.

Note that, it is preferable to use the graphite sheet with the surface thereof coated with polyester. By using the graphite sheet with the surface thereof coated, the surface of the graphite sheet can be protected from being damaged.

The heat-conductive member 450 is disposed between a light-irradiation surface of the liquid crystal panel 440 housed in the holder frame 446 and the fixing member 447 by abutting on both of them.

The heat-conductive member 450 is rectangular in plan view having an opening formed at the center for transmitting the light beam, which has a contacting portion 450A contacting the part not transmitting the light beam of a dust-proof glass of the liquid crystal panel 440, and the extended portions 450B extended from the contacting portion 450A to the fixing member 447 side and abutting on the lateral sides 447A4 of the fixing member 447.

Material used for such heat-conductive member 450 may be, for example, a graphite sheet, a copper plate, a copper foil or an aluminum foil. A graphite sheet is the most preferable to use among them. The graphite sheet can enhance adhesiveness to the dust-proof glass of the liquid crystal panel 440 and the fixing member 447 due to its flexibility. The graphite sheet can also enhance heat-conductivity from the dust-proof glass to the fixing member 447 since contact thermal resistance of the graphite sheet is extremely low.

Note that, it is preferable to use the graphite sheet with the surface thereof coated with polyester. By using the graphite sheet with the surface thereof coated, the surface of the graphite sheet can be protected from being damaged.

The fixing member 447 holds and fixes the holder frame 446 in which the liquid crystal panel 440 is housed, is the fixing member 447 being fixed on a light-incident surface of the cross dichroic prism 444. The fixing member 447 is made of heat-conductive material such as copper or aluminum.

The fixing member 447 includes a rectangular plate body 447A with a substantially rectangular opening 447A1 formed corresponding to the image formation area of the liquid crystal panel 440, substantially columnar pins 447B projected on the four corners of the rectangular plate body 447A, and an upper plate body 447C formed above the rectangular plate body 447A.

Note that, the positions of the pins 447B may not be the corners of the rectangular plate body 447A. Further, a number of the pins 447B may not be four, but may be any number as long as mare than one. Namely, the number of pins 447B can be set corresponding to the holes 446D of the holder frame 446.

The fixing member 447 is interposed between the holder frame 446 and the cross dichroic prism 444. The fixing member 447 and the cross dichroic prism 444 are fixed by bonding and fixing a light-irradiation surface of the rectangular plate body 447A of the fixing member 447 on the light-incident surface of the cross dichroic prism 444.

Further, the fixing member 447 and the holder frame 446 are fixed by inserting the pins 447B of the fixing member 447 to the holes 446D of the holder frame 446, and injecting a heat-conductive silicon adhesive (not shown), which is a heat-conductive bonding agent, inside the holes 446D. Note that, though the heat-conductive adhesive is injected inside the holes 446D, it is not limited. For example, solder may be injected as the heat-conductive bonding agent.

The upper plate body 447C is located above the base 445 disposed on the cross dichroic prism 444 side with an end surface on the light-incident side being flat. Screw holes 447C1 are formed on the four corners of the upper plate body 447C. Additionally, a plurality of protrusions 447C2 extending to the cross dichroic prism 444 are formed on an end surface on the light-irradiation side of the upper plate body 447C.

Further, cut portions is formed at the lower part on both longitudinal sides (the parts on the rectangular plate body 447A side) of the rectangular plate body 447A. Thus, the base 445 and the upper plate body 447C are not interfered with each other.

A heat-radiation fin 449 is attached to the upper plate body 447C.

The height of the heat-radiation fin 449 at the upper edge thereof is the substantially same as that of a control cable provided between the pair of substrates (not shown) of the liquid crystal panel 440.

The heat-radiation fin 449 includes a plate portion 449A being substantially rectangular in plan view attached to the surface on the light-incident side of the upper plate body 447C, and a plurality of fin members 449B provided on the plate portion 449A.

The heat-radiation fin 449 is made of heat-conductive material such as copper or aluminum, which is the same as the material of the fixing member 447.

The fin members 449B extend along a below-described first cooling path 51 (in vertical direction of FIG. 9) at regular intervals. The fin members 449B are treated by anti-reflection treatment such as black-plating or anodized black-aluminum coating.

The both longitudinal ends of the plate portion 449A are bent to the side opposite to the upper plate body 447C with cut portions being formed at the lower part of the both ends (the parts on the rectangular plate body 447A side). Thereby, the base 445 and the extended portions 445A are not interfered with each other.

Figure 10:
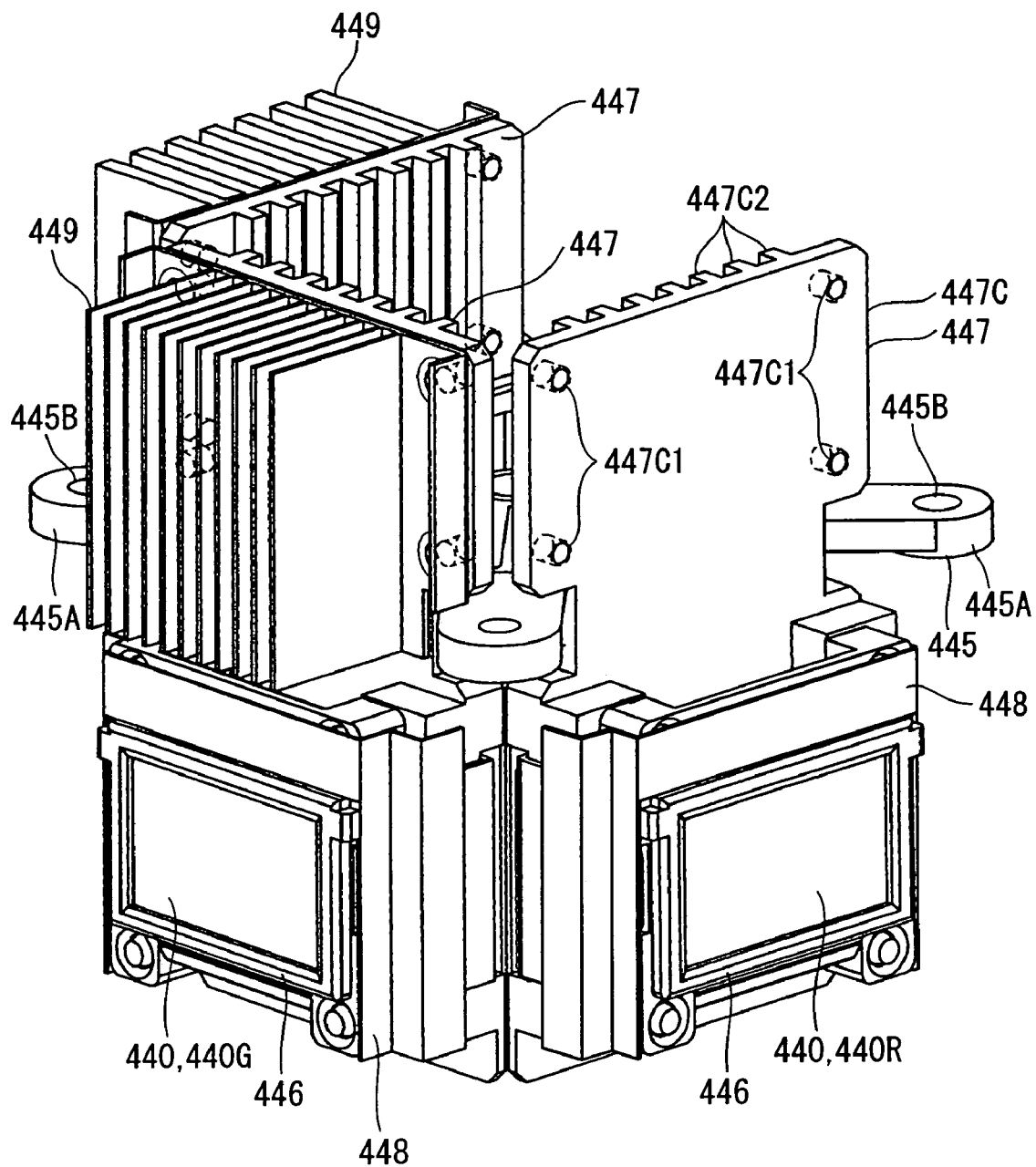
FIG. 10 is a perspective view showing a modification of the above optical device.

Additionally, holes 449A1 are formed on the four corners of the plate portion 449A at the positions corresponding to the screw holes 447C1 of the upper plate body 447C. Screws are inserted to the holes 449A1 as well as to the screw holes 447C1 and screwed them together for fixing, so that the heat-radiation fin 449 is fixed to the upper plate body 447C. As described above, in the present embodiment, since the heat-radiation fin 449 is screwed to the upper plate body 447C, in other words, since the heat-radiation fin 449 is detachably attached to the upper plate body 447C by screwing or unscrewing the screws, the heat radiation fin 449, for instance as shown in FIG. 10, may not be attached on the fixing member 447 to which the liquid crystal panel 440R for modulating the red light with the least heat value is fixed.

When the heat-radiation fin 449 and the upper plate body 447C are fixed, for instance, a silicon grease or the like are applied between the plate portion 449A of the heat-radiation fin 449 and the upper plate body 447C in order to enhance the heat-conductivity between them.

Figure 11:
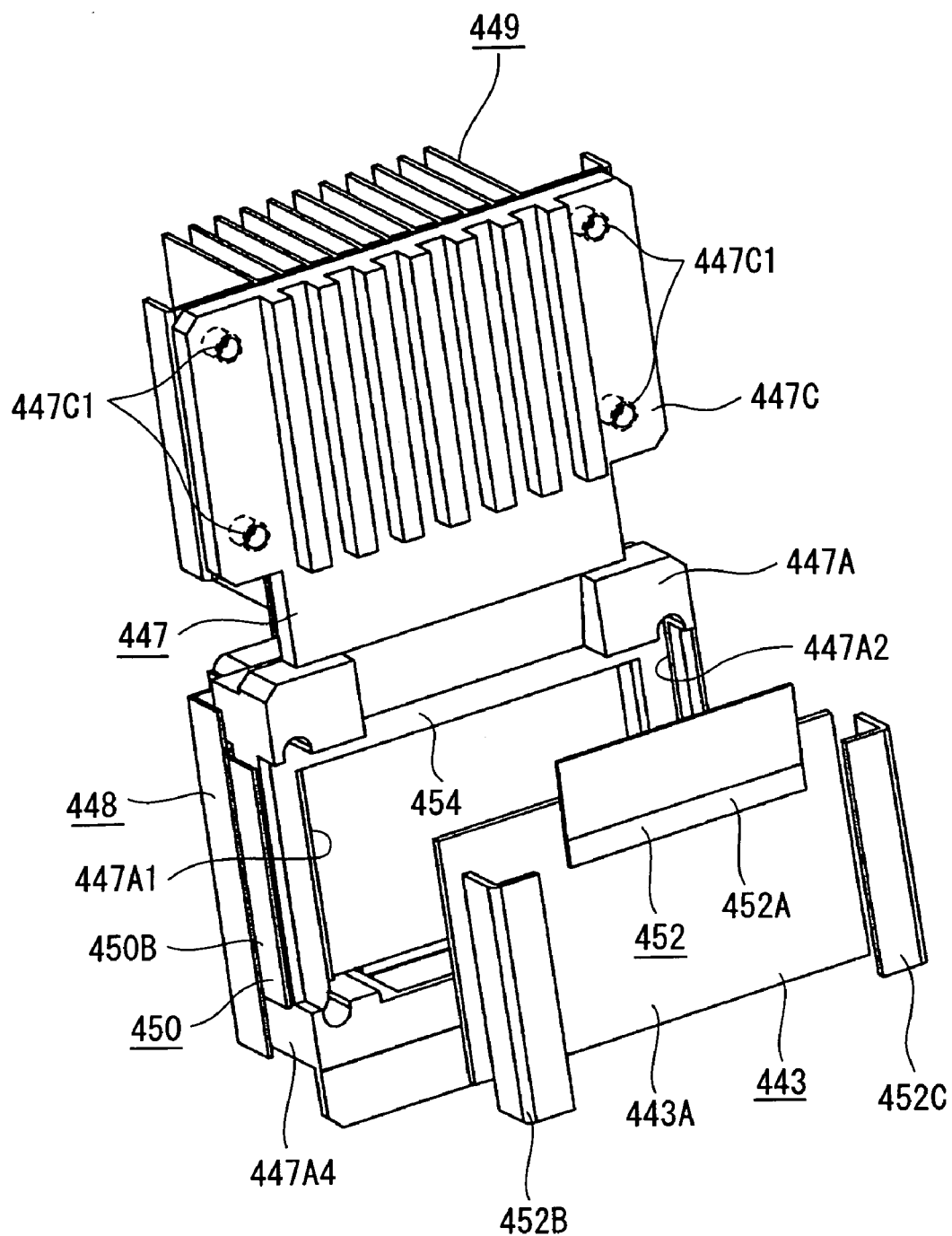
FIG. 11 is an exploded perspective view showing a fixing member and an irradiation-side polarization plate.

As shown in FIG. 11, a recess 447A2 in which the irradiation-side polarization plate 443 is housed is formed on the light-irradiation side of the rectangular plate body 447A of the fixing member 447. In other words, the irradiation-side polarization plate 443 is disposed between the light-irradiation surface of the fixing member 447 and the light-incident surface of the cross dichroic prism 444.

The light-incident surface of the transparent member (substrate) 443A of the irradiation-side polarization plate 443 is fixed to the light-irradiation surface of the recess 447A2 through the heat-conductive member 454. For example, on the peripheral edge of the opening 447A1, which is the light-irradiation surface of the recess 447A2, the heat-conductive member 454 such as a heat-conductive both sided tape, a heat-conductive sheet or silicon grease is attached, so that the irradiation-side polarization plate 443 is fixed by the heat-conductive member 454.

The sheet-like heat conductive component 452 is attached extending between the light-irradiation surface of the transparent member 443A of the irradiation-side polarization plate 443 and the rectangular plate body 447A by abutting on both of them.

Figure 12:
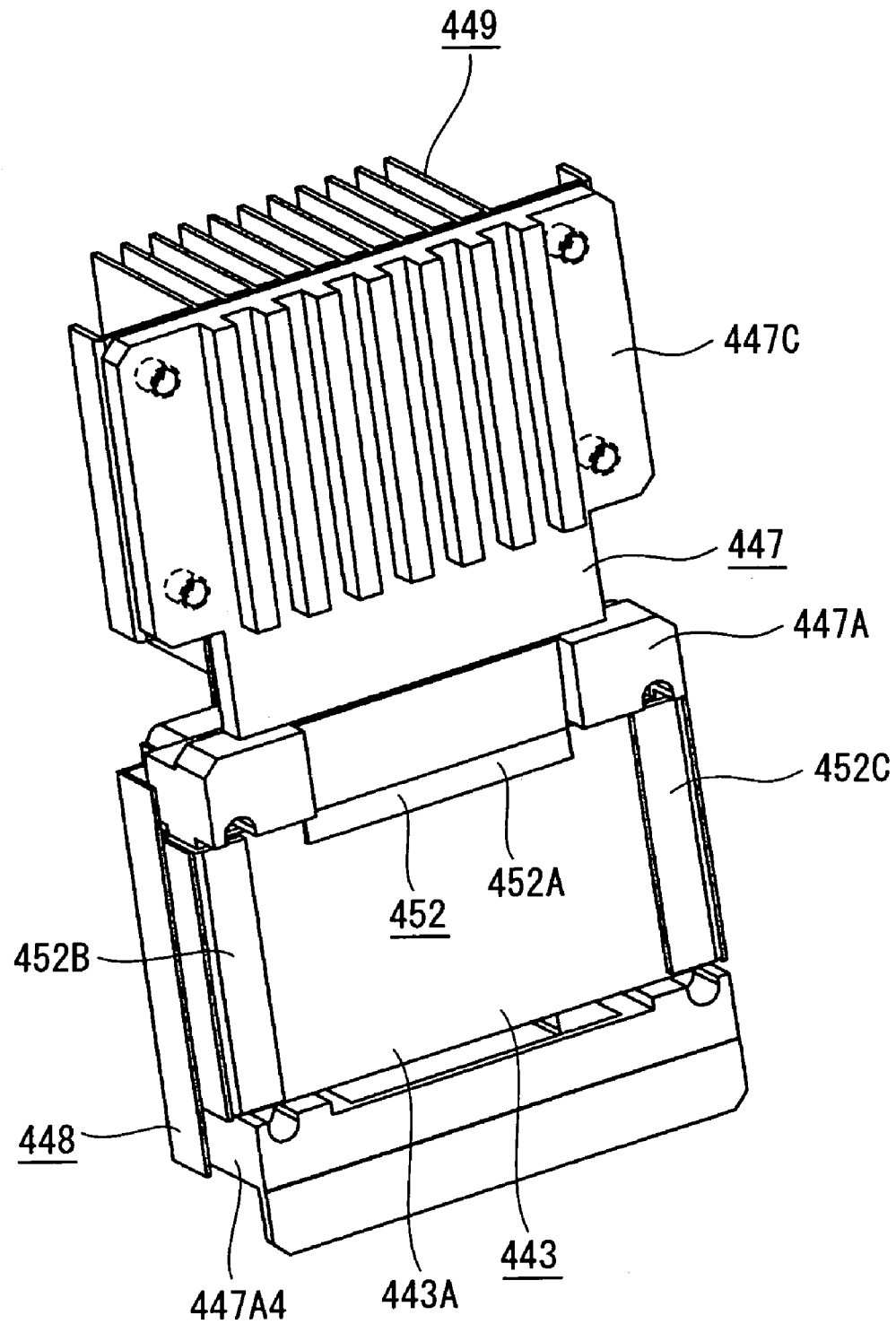
FIG. 12 is a perspective view showing the fixing member and the irradiation-side polarization plate.

More specifically, as shown in FIG. 12, a first heat-conductive member 452A is attached extending between the upper part of the light-irradiation surface of the transparent member 443A of the irradiation-side polarization plate 443 and the upper part of the light-irradiation surface of the rectangular plate body 447A by abutting on both of them.

Further, second and third heat-conductive members 452B and 452C are respectively attached extending between the left or right end of the light-irradiation surface of the transparent member 443A of the irradiation-side polarization plate 443 and either one of the lateral sides 447A4 of the rectangular plate body 447A. The second and third heat-conductive members 452B and 452C are substantially bent at a right angle with its cross section being substantially L-shape.

Actually, since the extended portions 450B of the heat-conductive member 450 are attached to the lateral sides 447A4 of the fixing member 447, the second and third heat-conductive members 452B and 452C abut on the lateral sides 447A4 of the fixing member 447 by interposing the extended portions 450B.

In the present embodiment, through the second and third heat-conductive members 452B and 452C are provided extending between the left or right end of the light-irradiation surface of the transparent member 443A of the irradiation-side polarization plate 443 and either one of the lateral sides of the rectangular plate body 447A, the second and third heat-conductive members 452B and 452C may be provided extending between the left or right end of the light-irradiation surface of the transparent member 443A of the irradiation-side polarization plate 443 and the inner side of the recess 447A2 of the rectangular plate body 447A.

Material used for such sheet-like heat-conductive member 452 may be, for example, a graphite sheet, a copper plate, a copper foil or an aluminum foil. A graphite sheet is the most preferable to use among them. The graphite sheet can enhance adhesiveness to the irradiation-side polarization plate 443 and the fixing member 447 due to its flexibility. The graphite sheet can also enhance heat-conductivity from the irradiation-side polarization plate 443 to the fixing member 447 since contact thermal resistance of the graphite sheet is extremely low.

Note that, it is preferable to use the graphite sheet with the surface thereof coated with polyester. By using the graphite sheet with the surface thereof coated, the surface of the graphite sheet can be protected from being damaged.

Figure 13:
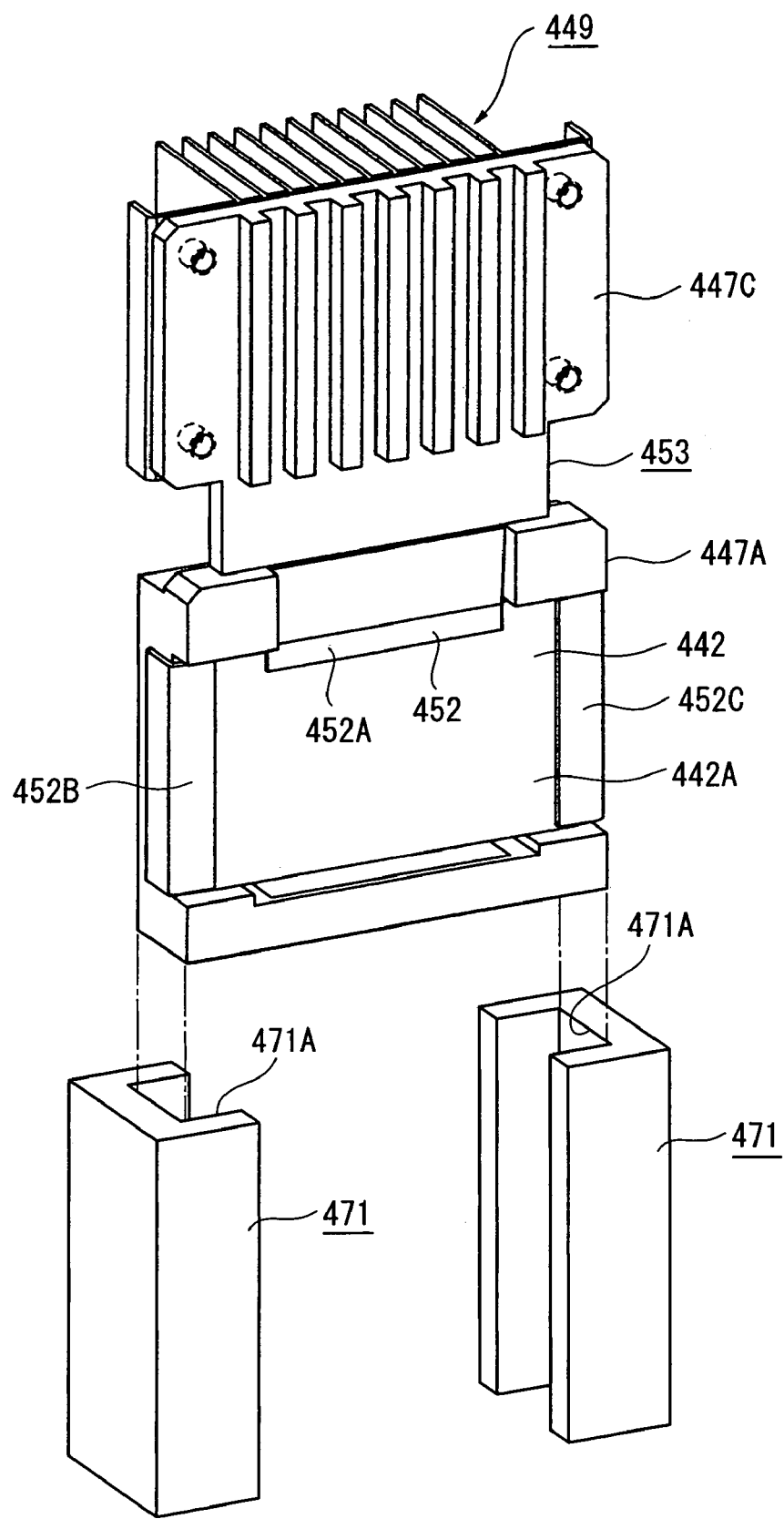
FIG. 13 is a perspective view showing an incident-side polarization plate and bosses formed at a light guide.

The incident-side polarization plate 442 is not integrally fixed to the light-incident surface of the cross dichroic prism 444, but fixed to the lower light guide of the light guide 47 as described above. As shown in FIG. 13, a pair of bosses 471, each of which has a groove 471A for fixing the incident-side polarization plate 442 by sliding it, are projected on the lower light guide.

The incident-side polarization plate 442 is fitted to the grooves 471A of the bosses 471 through a fixing member 453.

The fixing member 453 is configured similar to the fixing member 447, except that the pins are not projected thereon.

A heat-radiation fin 449 is attached to an upper plate body 447C of the fixing member 453.

In the same manner as the irradiation-side polarization plate 443, a light-incident surface of the incident-side polarization plate 442 and the fixing member 453 are fixed by a heat-conductive member 454. In addition to that, a sheet-like heat-conductive member 452 is attached extending between a light-irradiation surface of a transparent member 442A (substrate) of the incident-side polarization plate 442 and a rectangular plate body 447A of the fixing member 453.

The heat-conductive member 452 consists of first to third heat-conductive members 452A, 452B and 452C.

[2. Cooling Mechanism]

Next, the cooling mechanism of the inside of the projection television 10 is described below with reference to drawings.

Figure 14:
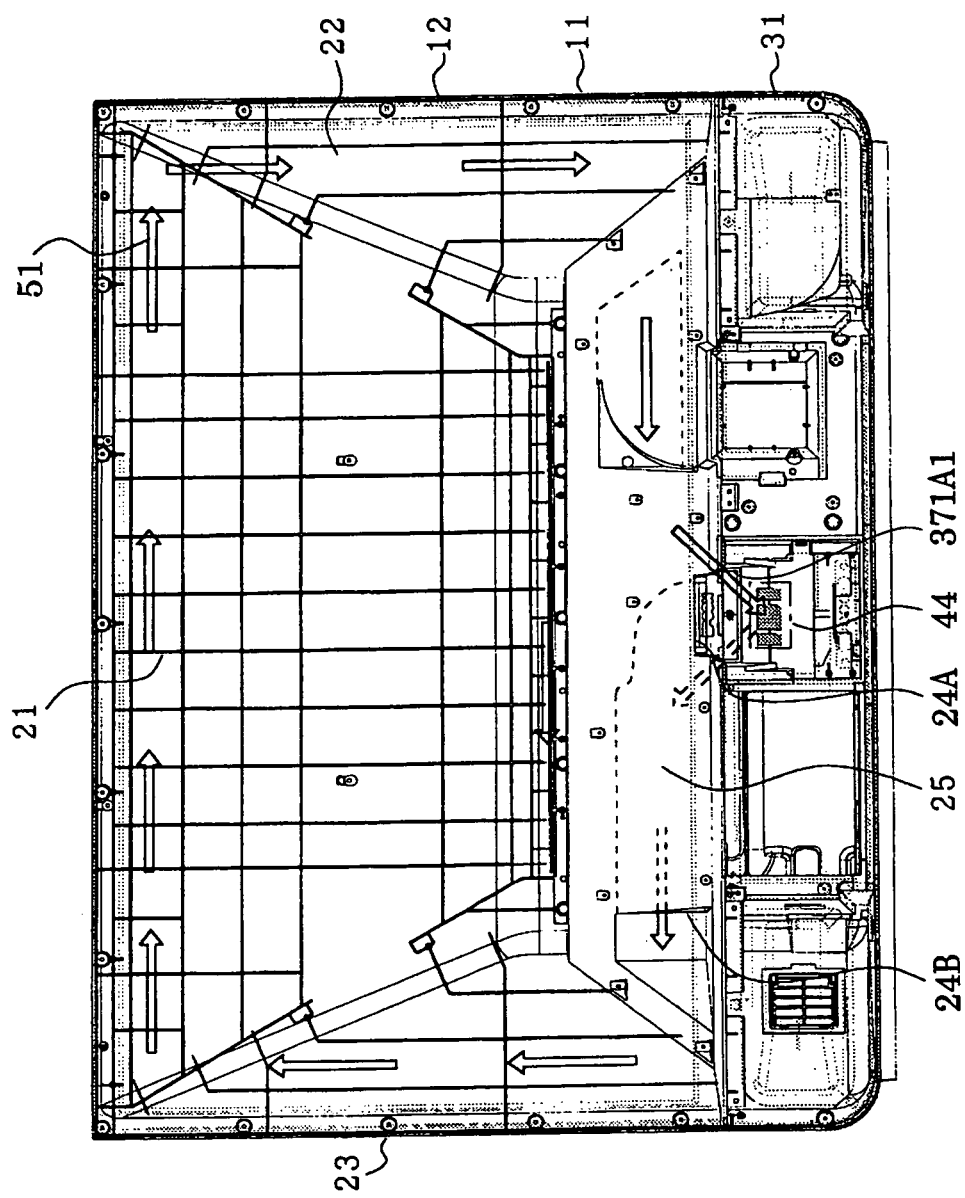
FIGS. 14A and 14B are illustrations each showing a first cooling path of the aforesaid embodiment.

FIGS. 14A and 14B are illustrations each showing a first cooling path 51. Specifically, FIG. 14A is an illustration of the first cooling path 51 as seen from the lateral side of the projection television 10, and FIG. 14B is an illustration of the first cooling path 51 as seen from the front side of the projection television 10.

Figure 15:
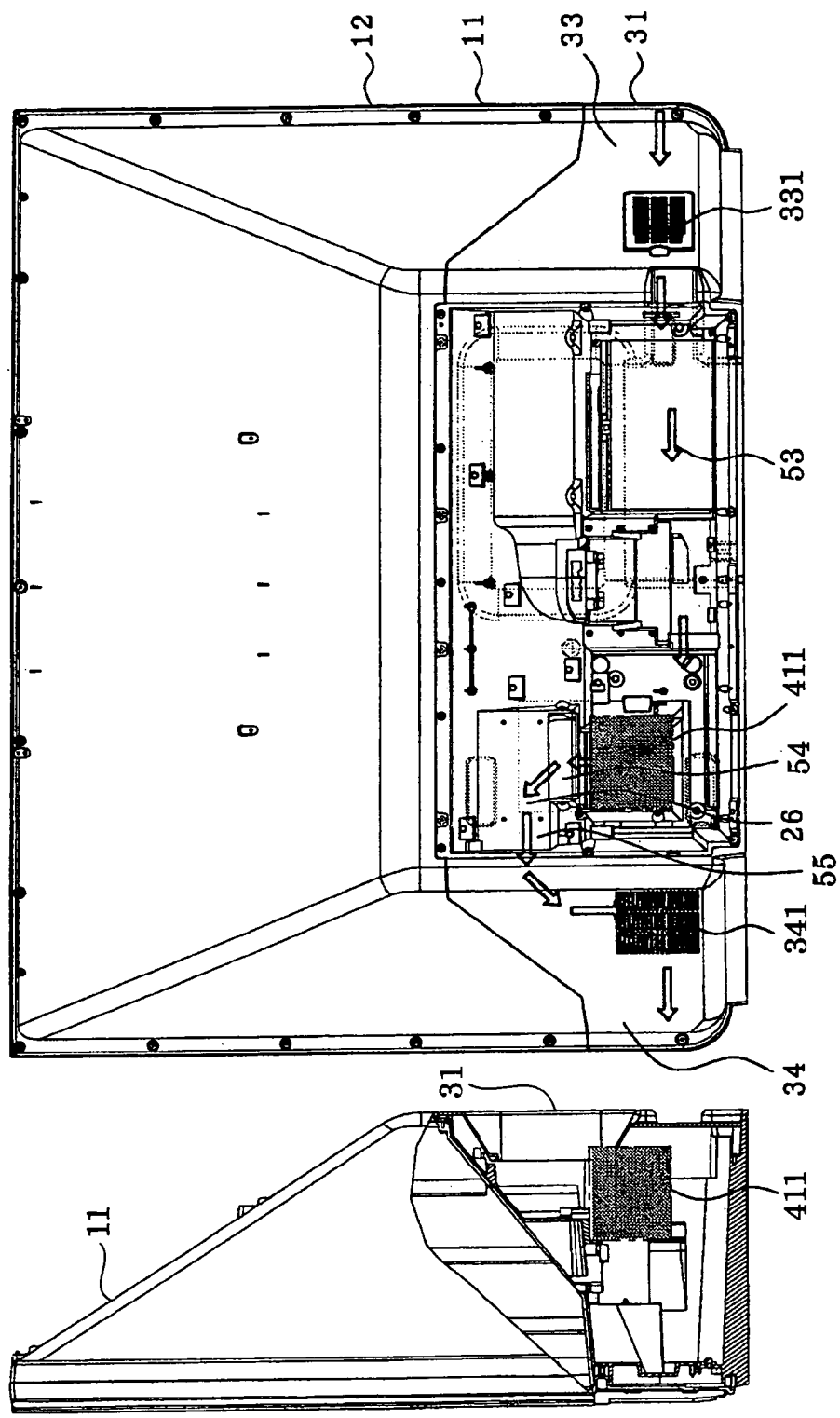
FIGS. 15A and 15B are illustrations each showing a second cooling path of the aforesaid embodiment.
Figure 16:
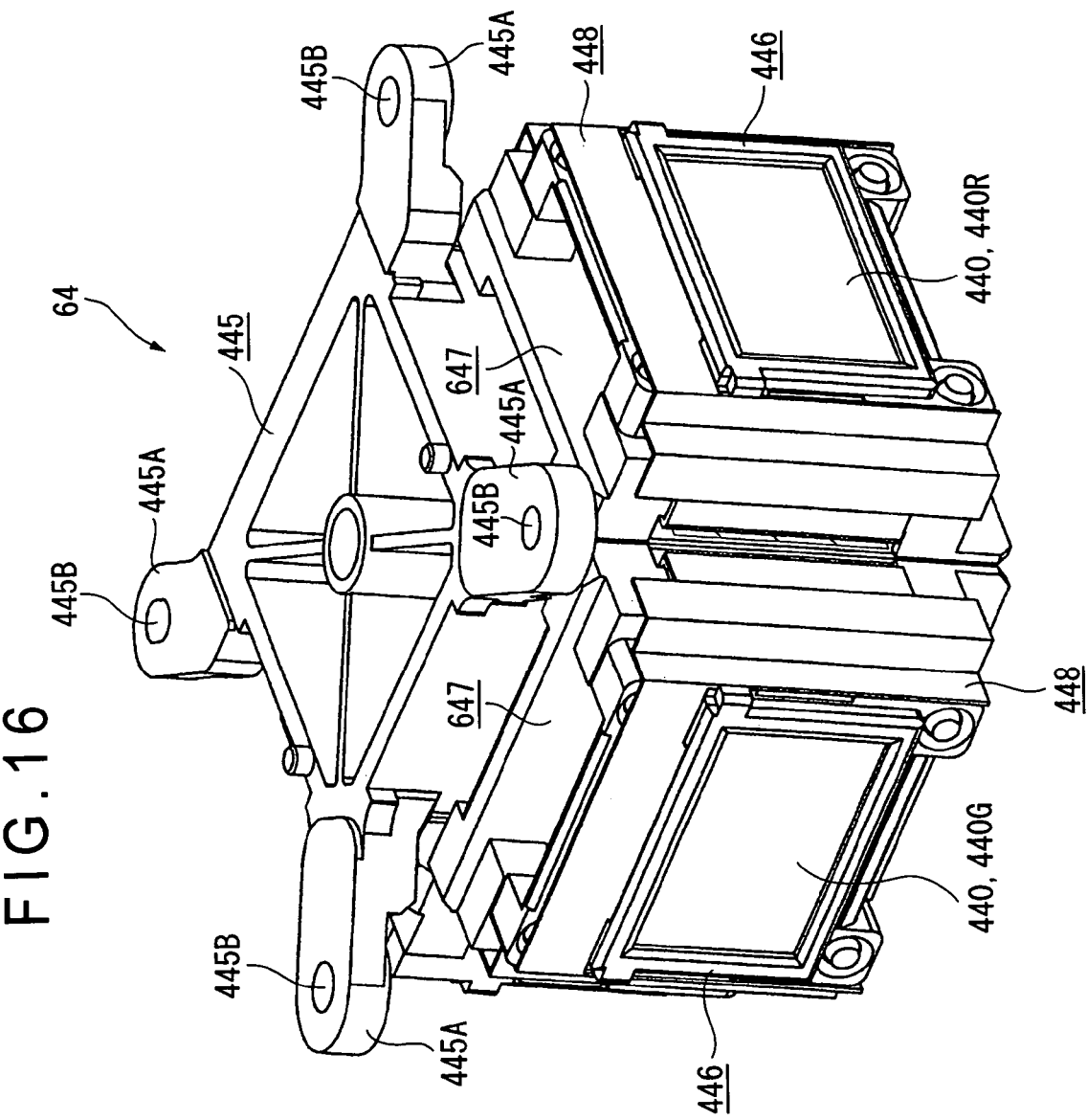
FIG. 16 is a perspective view showing an optical device according to a second embodiment of the present invention.

FIGS. 15A and 15B are illustrations each showing a second cooling path 53. Specifically, FIG. 15A is an illustration of the second cooling path 53 as seen from the lateral side of the projection television 10, and FIG. 15B is an illustration of the second cooling path 53 as seen from the front side of the projection television 10.

As shown in FIGS. 14A, 14B, 15A and 15B, there are provided in the projection television 10 the first cooling path 51 for mainly cooling the optical device 44 of the projection television 10, and the second cooling path 53 for mainly cooling the light source device 411.

Though not shown, a cooling fan located above the optical device 44 and provided on the suction side of the duct 25 is used for the first cooling path 51.

The cooling fan is an axial-flow fan with the intake direction of the air as well as the discharge direction of the sucked air being the same, which sucks the air above the optical device 44 and discharges the air to the duct 25. As shown in FIGS. 14A and 14B, because the cooling fan is driven, the air above the optical device 44 is sucked and the sucked air is discharged to the duct 25 through the cut portion 371A1 of the lower cabinet 31 and the cut portion 24A of the mirror case 12. The air discharged to the duct 25 is flown from the opening 24B of the mirror case 12, circulated along the side wall 23, the rear wall 21 and the side wall 22 of the mirror case 12, and then sucked by the cooling fan again. Thus, with the use of the cooling fan, the first cooling path 51 is formed so that the air circulates the internal space defined by the mirror case 12, the screen 14 and the like.

As shown in FIGS. 15A and 15B, the exhaust fan 54 attached on the light source device 411 of the optical unit 40 is used for the second cooling path 53.

The exhaust fan 54 is an axial-flow fan in the same manner as the cooling fan. As shown in FIGS. 15A and 15B, because the exhaust fan 54 is driven, the air outside the projection television 10 is drawn to the inside from the suction port 331 formed on the side panel 33 of the lower cabinet 31, and then introduced to the light source device 411 through the hole 372 (FIG. 5) formed on the setting portion 37 of the lower cabinet 31. The air introduced to the light source device 411 cools the light source lamp 416 and the reflector 417 of the light source device 411 while the air is drawn by the exhaust fan 54. The sucked air by the exhaust fan 54 is discharged to the duct 26, and then exhausted outside the projection television 10 from the exhaust port 341 formed on the side panel 33 of the lower cabinet 31 through the duct 26 and the duct 55.

The above-described first and second cooling paths 51 and 53 do not cross each other. Specifically, in the optical unit 40, since the integrator illuminating optical system 41, the color-separating optical system 42 and the relay optical system 43 interposed between the light source device 411 and the optical device 44 are housed inside the light guide 47, the air will not be circulated inside the light guide 47 from the optical device 44 to the light source device 411 or alternatively from the light source device 411 to the optical device 44. Further, at the outside of the light guide 47, since the setting portion 37 of the lower cabinet 31 divides the light source device 411 side and the optical device 44 side, the air will not be circulated from the optical device 44 side to the light source device 411 side or alternatively from the light source device 411 side to the optical device 44 side. With this configuration, because the cooling path inside the projection television 10 is divided into the first cooling path 51 and the second cooling path 53 not crossing with each other, the first cooling path 51 for cooling the optical device 44 can cool the optical device 44 by circulating the air of the internal space defined by the mirror case 12, the screen 14 and the like without taking the air from the outside, so that a component such as a filter arranged on the purpose of taking the air of the outside is not necessary. Further, though the second cooling path 53 for cooling the light source device 411 takes the air of the outside, it is not necessary to clean dusts from the air taken from the outside in the case of cooling the light source, thus simplifying the configuration thereof. Still, a filter may be provided at the suction port 331 of the second cooling path 53. Even in such case, since the optical device 44 is not included in the cooling path, the ability of the filter for removing dusts may be lowered.

[2-1. Heat-radiation Path of Optical Device]

In the projection television 10 of the present embodiment, a heat-radiation path is assured by the structure of the optical device 44 in addition to the forced cooling by the cooling fan when the optical device 44 is cooled.

Due to transmittance of the light beam from the light source device 411, heat is generated at the liquid crystal panel 440 of the optical device 44, the polarization film 443B of the irradiation-side polarization plate 443 and the polarization film of the incident-side polarization plate 442.

First, the hear-radiation path of the liquid crystal pane 440 is described.

Since the liquid crystal panel 440 is housed in the holder frame 446, heat generated at the liquid crystal panel 440 is transmitted to the holder frame 446 through the dust-proof glass of the liquid crystal panel 440.

The holes 446D of the holder frame 446 and the pins 447B of the fixing member 447 are fixed by the heat-conductive adhesive, so that a part of the heat transmitted to the holder frame 446 is transmitted to the fixing member 447 via the heat-conductive adhesive.

Additionally, since the heat-conductive frame 448 is attached between the light-incident surface e446A1 of the holder frame 446 and the fixing member 447, a part of the heat transmitted to the holder frame 446 is further transmitted to the fixing member 447 from the light-incident surface 446A1 of the holder frame 446 via the frame 448.

Further, as described above, since the heat-conductive member 450 is provided between the dust-proof glass on the light-irradiation side of the liquid crystal panel 440 housed in the holder frame 446 and the fixing member 447, the heat-conductive member 450 abutting on the part not transmitting the light beam of the dust-proof glass, and the fixing member 447. Therefore, heat generated at the liquid crystal panel 440 is transmitted from the dust-proof glass to the heat-conductive member 450, and further transmitted to the fixing member 447.

As described above, the heat generated at the liquid crystal panel 440 is transmitted to the fixing member 447, and consequently, the liquid crystal panel 440 is cooled by transmitting the heat.

Next, a heat-radiation path of the irradiation-side polarization plate 443 is described.

Since light-incident surface of the transparent member 443A of the irradiation-side polarization plate 443 is attached to the recess 447A2 of the fixing member 447 by interposing the heat-conductive member 454, a part of the heat generated at the irradiation-side polarization plate 443 is transmitted from the light-incident surface of the transparent member 443A to the fixing member 447 through the heat-conductive member 454.

Further, since the sheet-like heat-conductive member 452 is attached extending between the light-irradiation surface of the transparent member 443A of the irradiation-side polarization plate 443 and the rectangular plate body 447A, a part of the heat generated at the irradiation-side polarization plate 443 is transmitted from the light-irradiation surface of the transparent member 443A to the fixing member 447 via the heat-conducting component 452. Accordingly, the heat generated at the irradiation-side polarization plate 443 is transmitted to the fixing member 447, and consequently, the irradiation-side polarization plate 443 is cooled by transmitting the heat as well.

As described above, the heat transmitted to the fixing member 447 is transmitted to the heat-radiation fin 449 through the upper plate body 447C, and the heat is radiated by the cooling air passing through the above-described cooling path 51.

Next, a heat-radiation path of the incident-side polarization plate 442 is described.

Since the light-incident surface of the transparent member 442A of the incident-side polarization plate 442 and the fixing member 453 are fixed by the heat-conductive member 454, a part of the heat generated at the incident-side polarization plate 442 is transmitted to the fixing member 453.

Further, since the heat-conductive member 452 is attached extending between the light-irradiation surface of the transparent member 442A of the incident-side polarization plate 442 and the fixing member 453, a part of the heat generated at the incident-side polarization plate 442 is transmitted to the fixing member 453 through the heat-conductive member 452. Accordingly, the heat of the incident-side polarization plate 442 is radiated, and consequently, the incident-side polarization plate 442 is cooled by conducting the heat.

The heat transmitted to the fixing member 453 is cooled by the air inside the light guide 47 through the heat-radiation fin 449.

[3. Advantages of Embodiment]

According to the present embodiment, following advantages can be obtained.

(1) In the present embodiment, the holder frame 446 in which the liquid crystal panel 440 is housed is fixed to the cross dichroic prism 444 by interposing the fixing member 447. Therefore, the heat generated at the liquid crystal panel 440 due to the transmittance of the light beam is transmitted to the fixing member 447 via the holder frame 446. Since the heat-radiation fin 449 is fixed on the upper plate body 447C of the fixing member 447, the heat transmitted to the fixing member 447 is then transmitted to the heat-radiation fin 449. The surface area of the heat-radiation fin 449 is largely assured, so that the transmitted heat can be radiated efficiently.

Thereby, because the cooling efficiency (heat-radiation efficiency) of the liquid crystal panel 440 can be enhanced, the revolution of the cooling fan for cooling the liquid crystal panel 440 is not necessary to be increased, accordingly reducing the noise thereof.

Further, since the cooling ability of the cooling fan can be lowered, so that an inexpensive cooling fan can be applied, thus decreasing the cost.

Furthermore, enhancing the cooling efficiency of the liquid crystal panel 440 allows to lengthen the life span of the liquid crystal panel 440.

Incidentally, since the upper plate body 447C of the fixing member 447 and the heat-radiation fin 449 are fixed by interposing the silicon grease or the like, the adhesiveness between the fixing member 447 and the heat-radiation fin 449 can be enhanced, thus enhancing the heat-conductivity because of the absence of the air with low heat-conductivity between the fixing member 447 and the heat-radiation fin 449.

(2) In the present embodiment, since the heat-radiation fin 449 and the upper plate body 447C are fixed by screws and the heat-radiation fin 449 is detachably attached to the fixing member 447, the heat-radiation fin 449 can be attached or detached according to the heat value of the liquid crystal panel 440. For example, the heat-radiation fin 449 may not be attached to the fixing member 447, to which the liquid crystal panel 440R for modulating the red light with the least heat value. Thereby, the optical device 44 can be downsized, and the number of components thereof can be reduced.

(3) Since the fin members 449B of the heat-radiation fin 449 are treated by anti-reflection treatment such as black-plating or anodized black-aluminum coating, the light beam will not be reflected diffusely.

The treatment of black-plating as anti-reflection treatment enhances the heat-radiating ability (emitting ability) of the fin member 449B.

(4) Since the holes 446D of the holder frame 446 in which the liquid crystal panel 440 is housed and the pins 447B of the fixing member 447 are fixed by the heat-conductive adhesive, a part of the heat transmitted from the liquid crystal panel 440 to the holder frame 446 is transmitted to the fixing member 447 via the heat-conductive adhesive. Thereby, the heat can efficiently be conducted between the holder frame 446 and the fixing member 447, so that the heat-radiation efficiency of the liquid crystal panel 440 can be enhanced.

(5) Since the heat-conductive frame 448 is provided extending among the light-incident surface 446A1 and the lateral sides 446A2 of the recessed frame 446A of the holder frame 446 in which the liquid crystal panel 440 is housed; and the light-incident surface 447A3 and the lateral sides 447A4 of the fixing member 447, a part of the heat generated at the liquid crystal panel 440 is transmitted to the recessed frame 446A of the holder frame 446, the frame 448 and the fixing member 447. Therefore, the heat-radiation efficiency of the liquid crystal panel 440 can be enhanced.

Additionally, since the heat-conductive member 450 is arranged between the dust-proof glass on the light-irradiation side of the liquid crystal panel 440 and the fixing member 447, the heat transmitted to the dust-proof glass on the light-irradiation side can efficiently be transmitted to the fixing member 447.

As mentioned above, the heat from both the light-incident side and the light-irradiation side of the liquid crystal panel 440 can be transmitted to the fixing member 447, and besides the plurality of heat-transmission paths are formed, so that the heat-radiation efficiency of the liquid crystal panel 440 can further be enhanced.

(6) In the present embodiment, since the light-incident surface of the transparent member 443A of the irradiation-side polarization plate 443 and the light-irradiation surface of the recess 447A2 of the fixing member 447 are fixed by interposing the heat-conductive member 454, the heat generated at the polarization film 443B of the irradiation-side polarization plate 443 can efficiently be transmitted from the transparent member 443A to the fixing member 447. Besides, since the heat-radiation fin 449 is formed on the fixing member 447, the heat transmitted to the fixing member 447 can efficiently be radiated.

As described above, in the present embodiment, the heat generated at the irradiation-side polarization plate 443 can be radiated from the fixing member 447, so that the heat-radiation efficiency of the irradiation-side polarization plate 443 can also be enhanced.

Further, as mentioned above, since the heat-radiation efficiency of the irradiation-side polarization plate 443 can be enhanced, the irradiation-side polarization plate 443 can apply a transparent member 443A with its heat-conductivity being relatively low. For example, such a transparent member 443A can be made of crystal instead of sapphire, thus reducing the cost of the irradiation-side polarization plate 443.

(7) The sheet-like heat conductive component 452 is attached extending between the light-irradiation surface of the transparent member 443A of the irradiation-side polarization plate 443 and the rectangular plate body 447A of the fixing member 447.

Thus, the heat transmitted to the light-irradiation surface of the irradiation-side polarization plate 443 can efficiently be transmitted to the fixing member 447.

As described above, in the present embodiment, since the heat can be transmitted to the fixing member 447 from both the light-incident surface as well as the light-irradiation surface of the irradiation-side polarization plate 443, the heat-radiation efficiency of the irradiation-side polarization plate 443 can further be enhanced.

(8) Since the light-incident surface of the transparent member 442A of the incident-side polarization plate 442 and the fixing member 453 are fixed by the heat-conductive member 454, the heat generated at the incident-side polarization plate 442 can efficiently be transmitted to the fixing member 453.

Further, since the heat-conductive member 452 is attached extending between the light-irradiation surface of the transparent member 442A of the incident-side polarization plate 442 and the fixing member 453, a part of the heat generated at the incident-side polarization plate 442 can efficiently be transmitted to the fixing member 453 through the heat-conductive member 452.

Additionally, since the heat-radiation fin 449 is attached to the fixing member 453, the heat transmitted to the fixing member 453 can efficiently be radiated.

Thus, the heat-radiation efficiency of the incident-side polarization plate 442 can be enhanced, so that the incident-side polarization plate 442 can apply a transparent member 442A with its heat-conductivity being relatively low. For example, such a transparent member 443A can be made of crystal instead of sapphire, thus reducing the cost of the incident-side polarization plate 442.

(9) Because the frame 448, and the heat-conductive members 450 and 452 are made of graphite sheet, they are highly flexible and also highly adhesive against the holder frame 446 and the fixing member 447; the dust-proof glass of the liquid crystal panel 440 and the fixing member 447; the transparent member 443A of the irradiation-side polarization plate 443 and the rectangular plate body 447A of the fixing member 447; and the transparent member 442A of the incident-side polarization plate 442 and the rectangular plate body 447A of the fixing member 447. Therefore, the air with low heat-conductivity cannot be exist between the graphite sheet, the holder frame 446 and the like, so that the heat from the holder frame 446, the dust-proof glass, and the transparent members 443A and 442A can efficiently be transmitted to the fixing members 447 and 453.

Further, since the contact thermal resistance of the graphite sheet is extremely low, the heat-conduction efficiency from the holder frame 446 to the fixing member 447, the one from the dust-proof glass to the fixing member 447, the one from the transparent member 443A of the irradiation-side polarization plate 443 to the fixing member 447, and the one from the transparent member 442A of the incident-side polarization plate 442 to the fixing member 453 can be enhanced.

With the above-described configuration, the heat-radiation efficiency of the liquid crystal panel 440, that of the irradiation-side polarization plate 443, and that of the incident-side polarization plate 442 can further be enhanced.

[Second Embodiment]

Next, a second embodiment of the present invention will be described below with reference to FIGS. 16 through 19. Incidentally, in the following description, the same reference numeral will be attached to the same components as the above to omit the description thereof.

An optical device 64 of the present embodiment has a fixing member 647 having a profile different from the fixing member 447 of the optical device 44 in the above-described embodiment. Specifically, the optical device 64 of the present embodiment includes the liquid crystal panel 440, the incident-side polarization plate 442, the irradiation-side polarization plate 443, the cross dichroic prism 444, the base 445, the holder frame 446 and the fixing member 647. The above components except the fixing member 647 are the same as that of the optical device 44.

Figure 17:
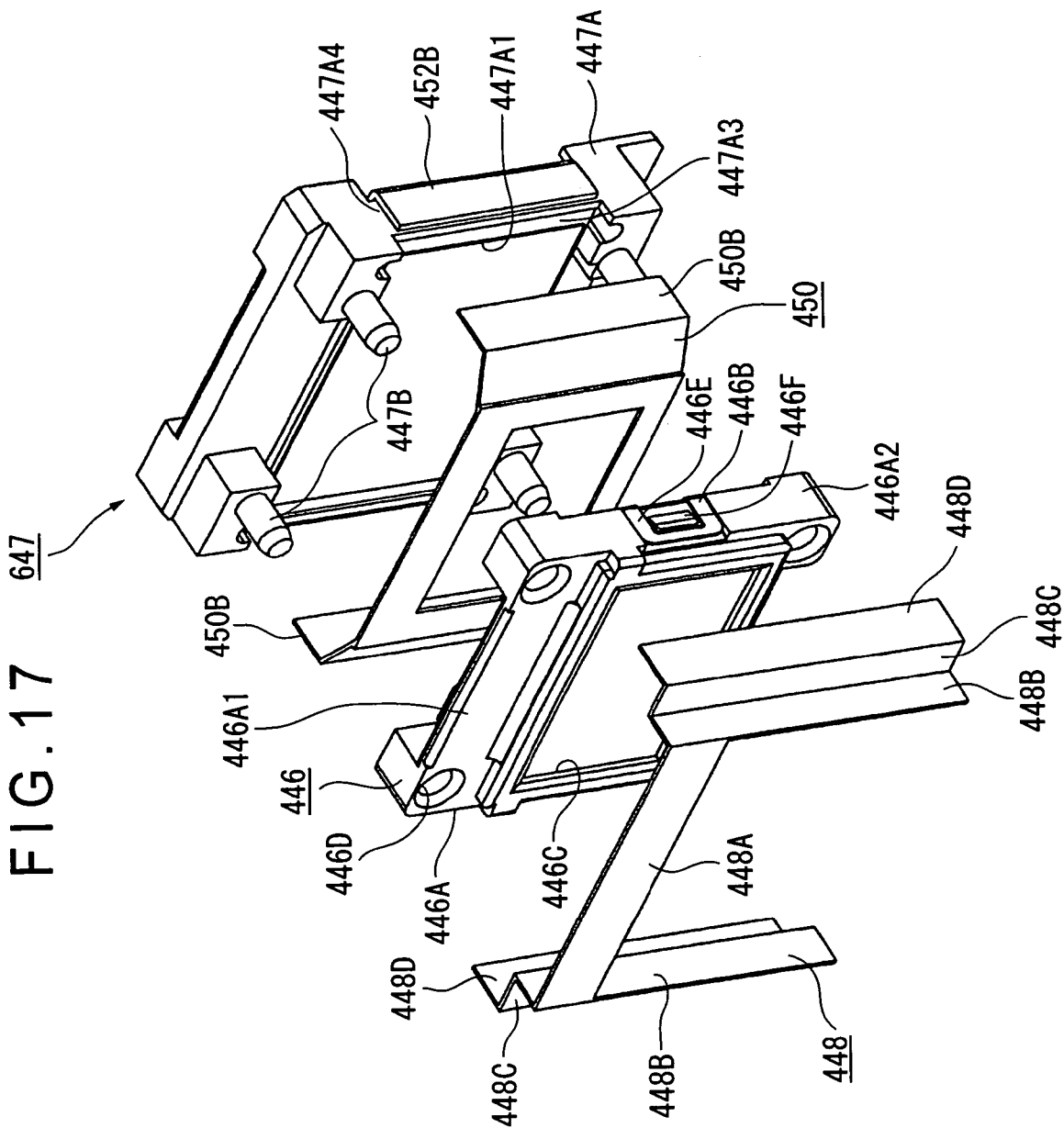
FIG. 17 is an exploded perspective view of the optical device.

As shown in FIG. 17, the fixing member 647 is made of the same material as the fixing member 447, and includes the rectangular plate body 447A, the substantially columnar pins 447B projected from the four corners of the rectangular plate body 447A, however, the fixing member 647 is different from the fixing member 447 in that the upper plate body 447C is not provided. Because the upper plate body 447C is not provided on the fixing member 647, the optical device 64 of the present embodiment does not have a heat-radiation fin supposed to be attached to the upper plate body 447C.

The heat-conductive frame 448 is attached extending among a light-incident surface 447A3 and lateral sides 447A4 of the fixing member 647; and the light-incident surface 446A1 and the lateral sides 446A2 of the recessed frame 446A of the holder frame 446.

The heat-conductive member 450 is disposed between the light-irradiation surface of the liquid crystal panel 440 housed in the holder frame 446 and the fixing member 647 by abutting on both of them.

Figure 18:
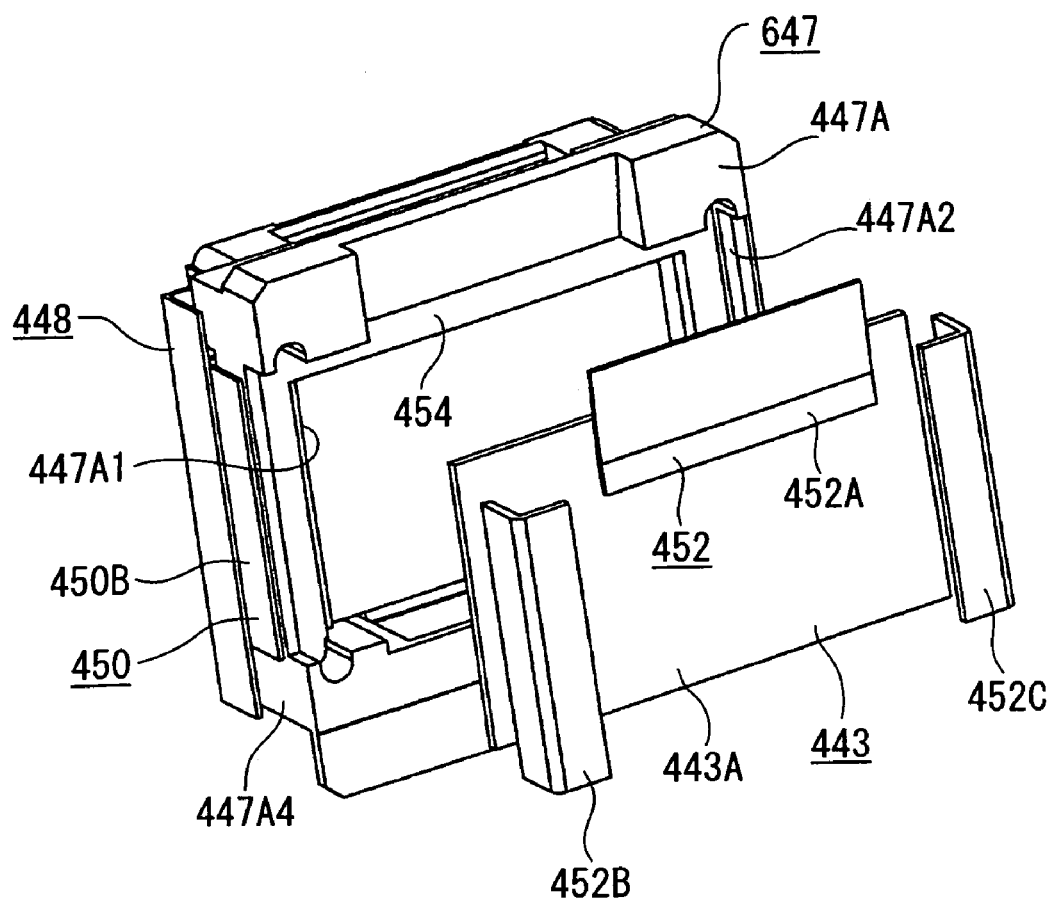
FIG. 18 is an exploded perspective view showing a primary portion of the optical device.
Figure 19:
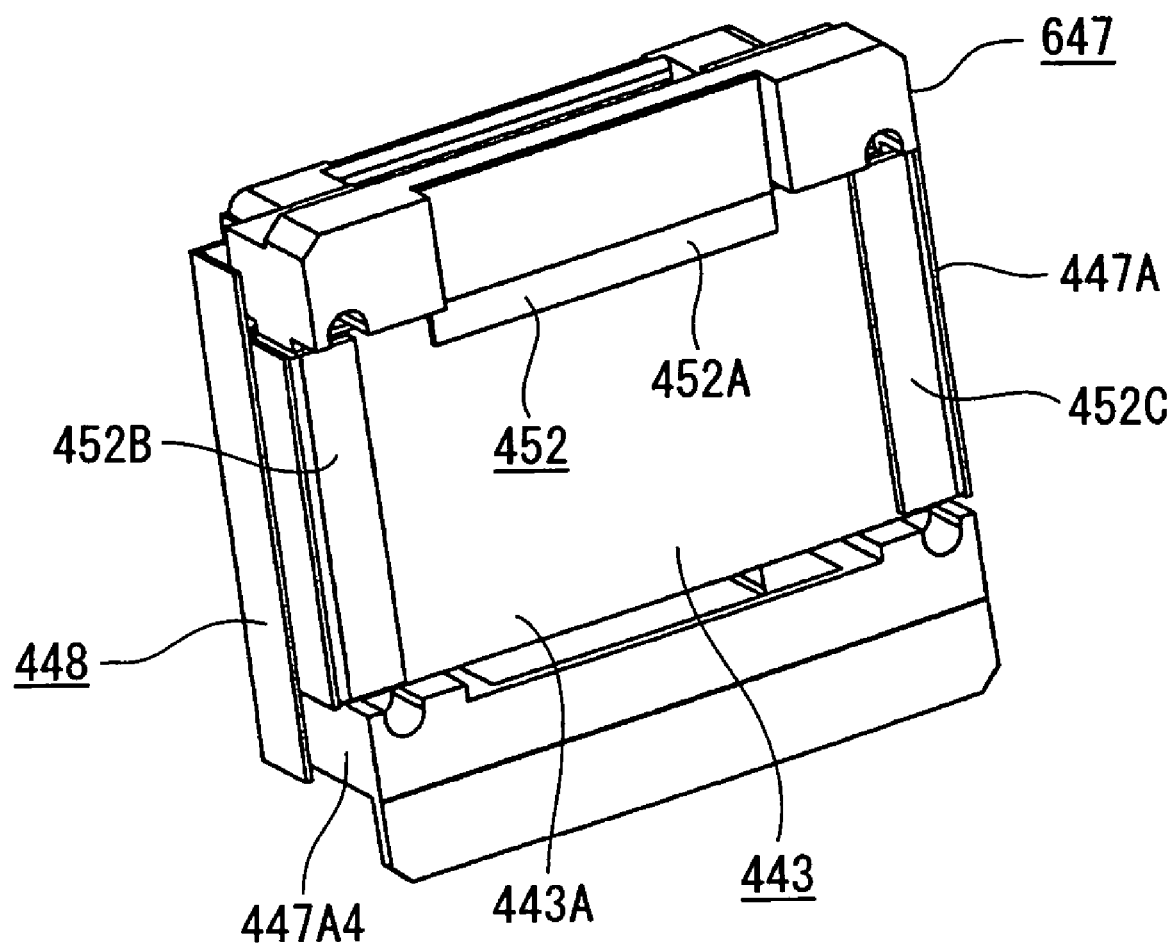
FIG. 19 is a perspective view showing a primary portion of the optical device.

Further, as shown in FIGS. 18 and 19, the light-incident surface of the transparent member (substrate) 443A of the irradiation-side polarization plate 443 and the light-irradiation surface of the recess 447A2 of the fixing member 647 are fixed by interposing the heat-conductive member 454 such as a heat-conductive both sided tape, a heat-conductive sheet or silicon grease.

Additionally, the sheet-like heat-conductive member 452 is attached extending between the light-irradiation surface of the transparent member 443A of the irradiation-side polarization plate 443 and the rectangular plate body 447A of the fixing member 647 by abutting on both of them.

The heat-radiation path of the respective optical components of the optical device 64 are the substantially same as that of the above-described embodiment, however, the heat transmitted to the fixing member 647 is not transmitted to a heat-radiation fin but cooled by the cooling air, since there is no heat-radiation fin.

Though not illustrated in the present embodiment, the fixing member 453 to which the incident-side polarization plate 442 is fixed does not have the upper plate body 447C neither.

According to the present embodiment, following advantages can be obtained in addition to the same advantages (4) through (9) as the first embodiment.

(10) In the present embodiment, the holder frame 446 in which the liquid crystal panel 440 is housed is fixed to the cross dichroic prism 444 by interposing the fixing member 647. Therefore, the heat generated at the liquid crystal panel 440 due to the transmittance of the light beam is transmitted and radiated to the fixing member 647 via the holder frame 446.

Thus, because the cooling efficiency (heat-radiation efficiency) of the liquid crystal panel 440 can be enhanced, the revolution of the cooling fan for cooling the liquid crystal panel 440 is not necessary to be increased, accordingly reducing the noise thereof.

Further, since the cooling ability of the cooling fan can be lowered, an inexpensive cooling fan can be applied, thus decreasing the cost.

Furthermore, enhancing the cooling efficiency of the liquid crystal panel 440 allows to lengthen the life span of the liquid crystal panel 440.

(11) In the present embodiment, since the fixing member 647 of the optical device 64 does not have the upper plate body 447C whereas the optical device 64 does not have the heat-radiation fin, a number of components of the optical device 64 can be reduced as well as the optical device 64 can be downsized.

Incidentally, the scope of the present invention is not restricted to the above-described embodiments, but includes modifications and improvements as long as an object of the present invention can be achieved.

For example, in the respective embodiments, though the incident-side polarization plate 442 is attached to the fixing member 453 to be fixed to the light guide 47, it is not limited thereto, and the incident-side polarization plate 442 can directly be inserted to the bosses 471 formed on the light guide 47. In this case, the heat generated at the incident-side polarization plate 442 is directly transmitted from the transparent member 442A to the bosses 471, and consequently, radiated to the light guide 47. Accordingly, the number of components can be reduced.

In the respective embodiment, though the sheet-like heat conductive component 452 is attached extending between the light-irradiation surface of the transparent member of the irradiation-side polarization plate 443 and the rectangular plate body 447A of the fixing member 447, the heat-conductive member 452 may not be provided.

Further, though the light-incident surface of the transparent member 443A of the irradiation-side polarization plate 443 and the light-irradiation surface of the recess 447A2 of the fixing member 447 are fixed by interposing the heat-conductive member 454, they may be fixed by an adhesive with its heat-conductivity is low. In this case, the heat generated at the irradiation-side polarization plate 443 is radiated to the fixing member 453 via the heat-conductive member 452.

Figure 20:
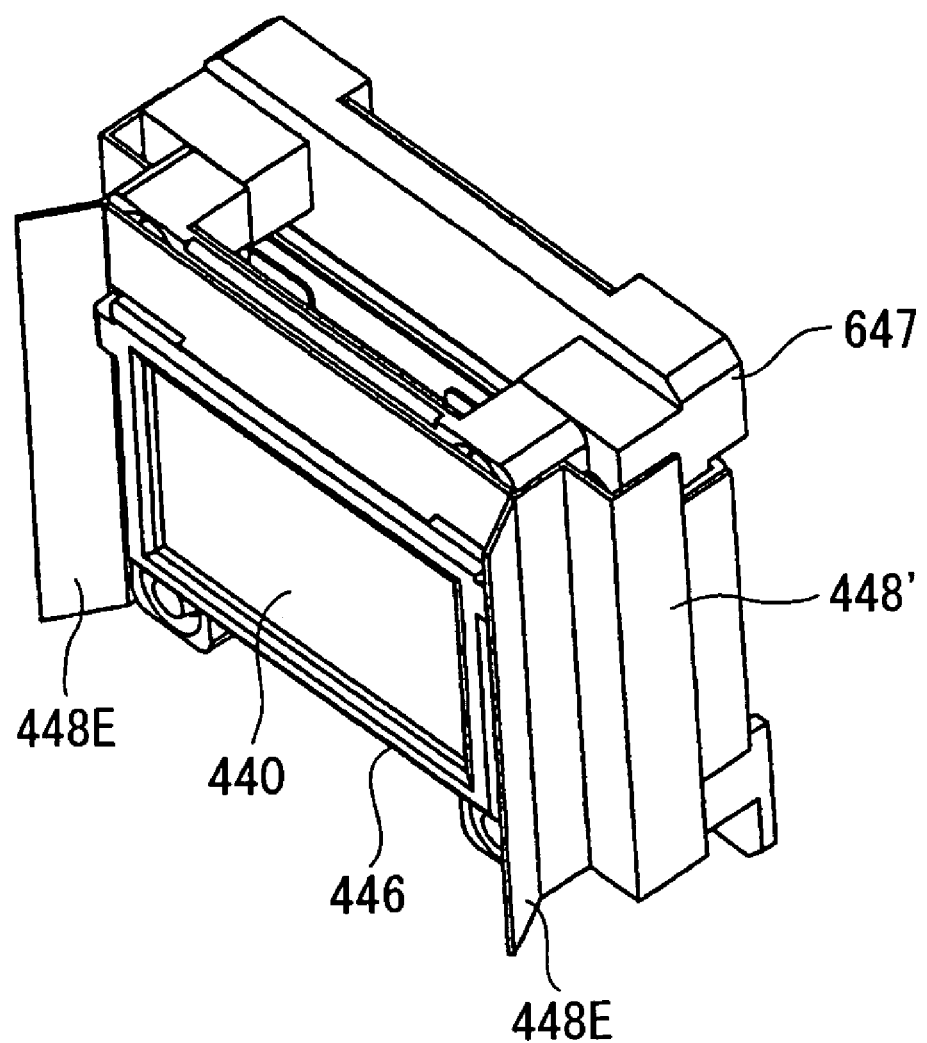
FIG. 20 is a perspective view showing a modification of the present invention.
Figure 21:
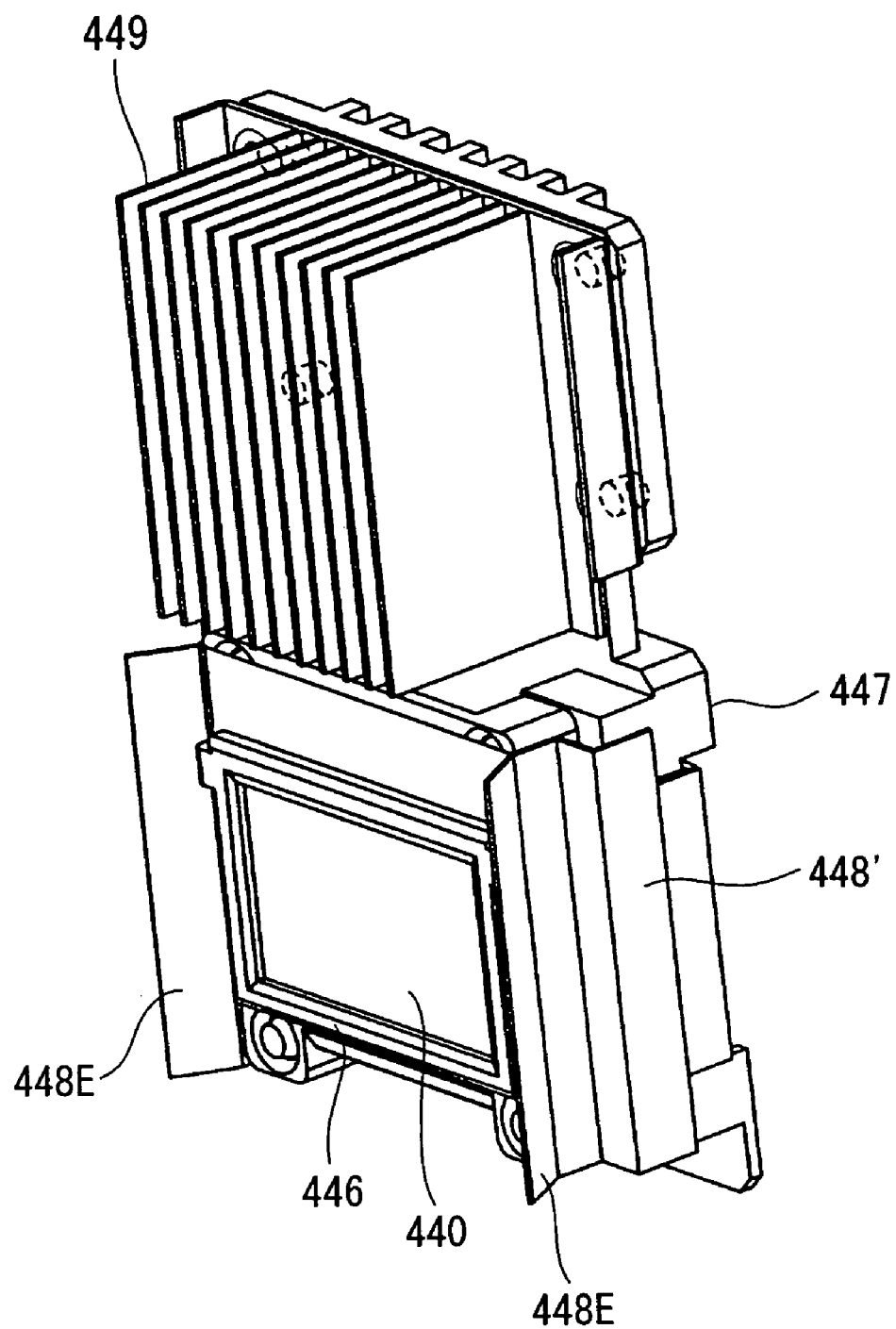
FIG. 21 is a perspective view showing the modification of the present invention.

Further, in the respective embodiments, though the heat-conductive member 450 is provided between the light-irradiation surface of the dust-proof glass on the irradiation-side of the liquid crystal panel 440 and the fixing member 447, the heat-conductive member 450 may not be provided. Furthermore, though the heat-conductive frame 448 is provided extending among the light-incident surface 446A1 and the lateral sides 446A2 of the recessed frame 446A of the holder frame 446 in which the liquid crystal panel 440 is housed; the light-incident surface 447A3 and the lateral sides 447A4 of the fixing member 447, the frame 448 may not employ the above-described configuration. As shown in FIGS. 20 and 21, a frame 448' with a heat-radiation fin 448E formed can be applied.

The heat-radiation fin 448E provided on the frame 448' extends along the flow of the cooling air passing through the first cooling path 51, and inclines against the light-incident surface of the holder frame 446. Since the heat-radiation fin 448E is formed on the frame 448', the surface area thereof can be largely assured, so that thermal exchange can easily be conducted between the heat transmitted to the frame 448' and the cooling air passing through the first cooling path 51, thus enhancing the heat-radiation efficiency of the frame 448'.

Alternatively, the frame 448 may not be provided. Accordingly, the number of components can be reduced.

Figure 22:
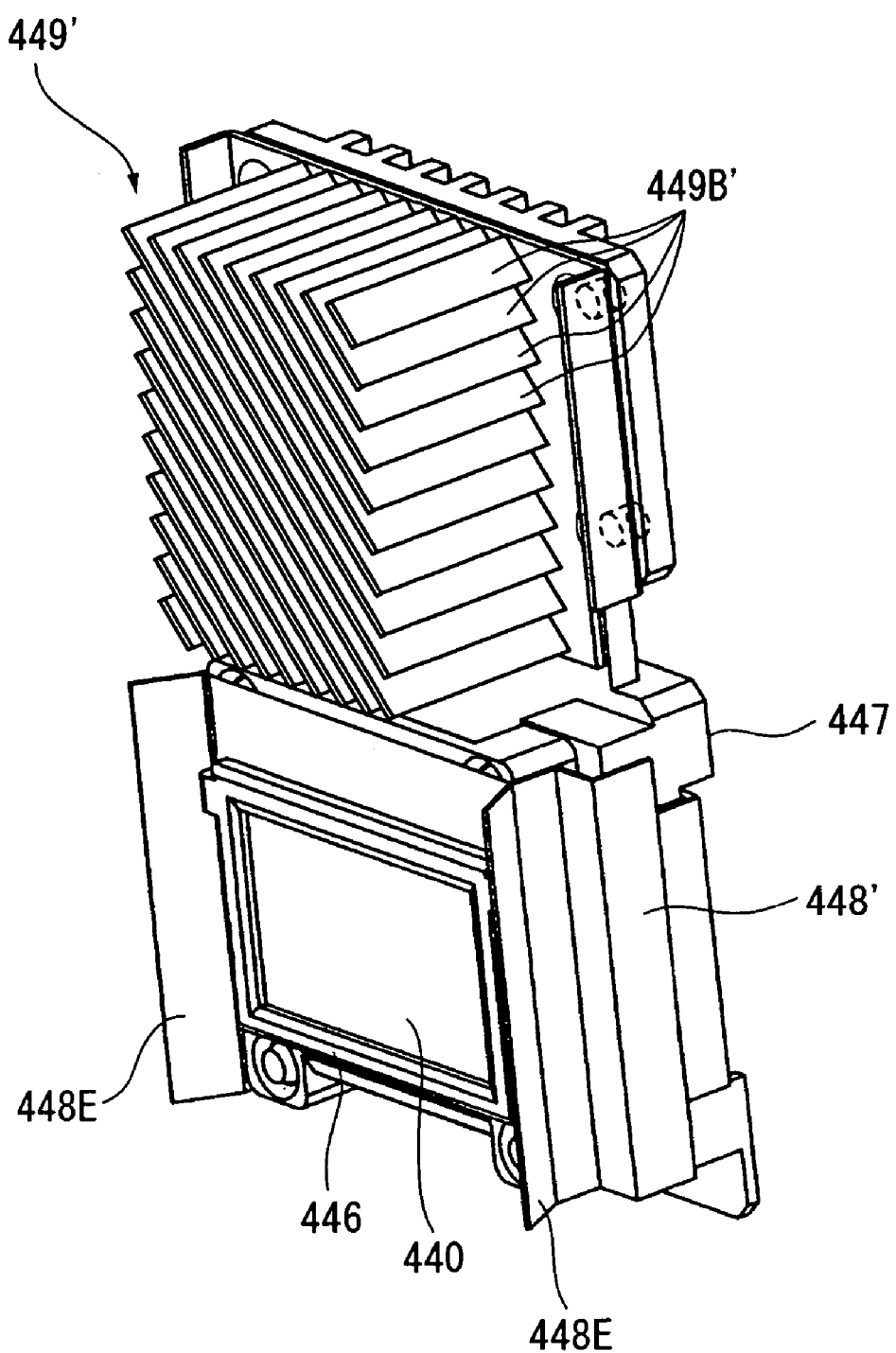
FIG. 22 is a perspective view showing another modification of the present invention.

Further, in the respective embodiments, though the respective fin members 449B of the heat-radiation fin 449 extend along the first cooling path 51, it is not limited thereto. As shown in FIG. 22, the direction in which respective fins components 449B' are arranged may incline against the first cooling path 51 by approximately 45 degrees.

The use of such heat-radiation fin 449' makes the cooling air flow to the fin members 449B' easily, thus enhancing the cooling efficiency of the fin members 449B'. Because the cooling efficiency of the fin members 449B' is enhanced, the heat of the liquid crystal panel 440 can easily be transmitted to the fin members 449B', thus enhancing the heat-radiation efficiency of the liquid crystal panel 440.

In the first embodiment, though the heat-radiation fin 449 is fixed on the upper plate body 447C of the fixing member 447 by screws, and thus the heat-radiation fin 449 is detachably attached to the fixing member 447, it is not limited thereto, and the heat-radiation fin 449 and the fixing member 447 can be integrated. Accordingly, the number of components can be reduced. By integrating the fixing member 447 and the heat-radiation fin 449, the heat-transmission efficiency from the fixing member 447 to the heat-radiation fin 449 can be enhanced.

Further, in the respective embodiments, though the optical device 44 is applied to the projection television 10 as a rear projector, it is not limited thereto, and the optical device 44 may be applied to a projector of front-projection type.

What is claimed is:

1. An optical device, comprising:
   an optical modulator that modulates a light beam irradiated by a light source in accordance with image information; and
   a color-combining optical device that combines the optical image formed by the optical modulator,
   wherein the optical modulator is housed in a holder frame having an opening formed corresponding to an image formation area of the optical modulator,
   wherein the holder frame housing the optical modulator therein, is fixed to a heat-conductive fixing member attached along a light-incident surface of the color-combining optical device,
   wherein a heat-radiation fin with platy fin members is provided on an extension of the fixing member, the extension extending along the light-incident surface of the color-combining optical device,
   wherein a cooling fluid is flown to the optical modulator, and
   wherein a direction in which the fin members of the heat-radiation fin are arranged inclines against a path of the cooling fluid by approximately 45 degrees.

2. The optical device according to claim 1, wherein the heat-radiation fin and the fixing member are integrally formed.

3. The optical device according to claim 1, wherein the heat-radiation fin is detachably attached to the fixing member.

4. The optical device according to claim 1, wherein the fin members of the heat-radiation fin are treated by anti-reflection treatment so that the light beam will not be reflected.

5. The optical device according to claim 1, wherein a heat-conductive member is provided extending between the holder frame and the fixing member by abutting on both of them.

6. The optical device according to claim 5, wherein a heat-radiation fin is formed at the heat-conductive member.

7. The optical device according to claim 1, wherein the holder frame housing the optical modulator therein and the fixing member are bonded by a heat-conductive bonding agent.

8. The optical device according to claim 1, wherein a heat-conductive member is provided between a light-irradiation surface of the optical modulator and the fixing member by abutting on both of them.

9. The optical device according to claim 1, further comprising:
an optical conversion plate disposed between a light-incident surface of the color-combining optical device and a light-irradiation surface of the fixing member,
wherein the optical conversion plate includes a transparent member made of heat-conductive material, and an optical conversion film attached on the transparent member to convert optical characteristics of the light beam irradiated by the optical modulator, and
wherein a light-incident surface of the transparent member and the light-irradiation surface of the fixing member are fixed by interposing a heat-conductive member therebetween.

10. The optical device according to claim 1, further comprising:
an optical conversion plate disposed between a light-incident surface of the color-combining optical device and a light-irradiation surface of the fixing member,
wherein the optical conversion plate includes a transparent member made of heat-conductive material, and an optical conversion film attached on the transparent member to convert optical characteristics of the light beam irradiated by the optical modulator, and
wherein a heat-conductive member is provided extending between a light-irradiation surface of the transparent member and the fixing member by abutting on both of them.

11. An optical device, comprising:
an optical modulator that modulates a light beam irradiated by a light source in accordance with image information; and
a color-combining optical device that combines the optical image formed by the optical modulator,
wherein the optical modulator is housed in a holder frame having an opening formed corresponding to an image formation area of the optical modulator,
wherein the holder frame housing the optical modulator therein, is fixed to a heat-conductive fixing member attached along a light-incident surface of the color-combining optical device, and
wherein a heat-conductive member is provided extending between the holder frame and the fixing member by abutting on both of them.

12. The optical device according to claim 11, wherein a heat-radiation fin is formed at the heat-conductive member.

13. The optical device according to claim 11, wherein the holder frame housing the optical modulator therein and the fixing member are bonded by a heat-conductive bonding agent.

14. The optical device according to claim 11, wherein a heat-conductive member is provided between a light-irradiation surface of the optical modulator and the fixing member by abutting on both of them.

15. The optical device according to claim 11, further comprising:
an optical conversion plate disposed between a light-incident surface of the color-combining optical device and a light-irradiation surface of the fixing member,
wherein the optical conversion plate includes a transparent member made of heat-conductive material, and an optical conversion film attached on the transparent member to convert optical characteristics of the light beam irradiated by the optical modulator, and
wherein a light-incident surface of the transparent member and the light-irradiation surface of the fixing member are fixed by interposing a heat-conductive member therebetween.

16. The optical device according to claim 11, further comprising:
an optical conversion plate disposed between a light-incident surface of the color-combining optical device and a light-irradiation surface of the fixing member,
wherein the optical conversion plate includes a transparent member made of heat-conductive material, and an optical conversion film attached on the transparent member to convert optical characteristics of the light beam irradiated by the optical modulator, and
wherein a heat-conductive member is provided extending between a light-irradiation surface of the transparent member and the fixing member by abutting on both of them.

17. A rear projector, comprising:
an optical device that modulates a light beam irradiated by a light source to form an optical image in accordance with image information;
an image formation section including a projection optical system that projects the optical image in an enlarged manner;
a casing for housing the image formation section; and
a screen provided on the casing in an exposed manner, on which the optical image formed by the image formation section is projected,
the optical device comprising:
an optical modulator that modulates the light beam irradiated by the light source in accordance with the image information; and
a color-combining optical device that combines the optical image formed by the optical modulator,
wherein the optical modulator is housed in a holder frame having an opening formed corresponding to an image formation area of the optical modulator,
wherein the holder frame housing the optical modulator therein, is fixed to a heat-conductive fixing member attached along a light-incident surface of the color-combining optical device,
wherein a heat-radiation fin with platy fin members is provided on an extension of the fixing member, the extension extending along the light-incident surface of the color-combining optical device,
wherein a cooling fluid is flown to the optical modulator, and
wherein a direction in which the fin members of the heat-radiation fin are arranged inclines against a path of the cooling fluid by approximately 45 degrees.

18. The rear projector according to claim 17, further comprising:
an optical conversion plate having an optical conversion film that converts optical characteristics of the light beam entering the optical modulator of the optical device and a transparent member, on which the optical conversion film is attached; and
an optical component casing, in which the optical device and the optical conversion plate are housed,
wherein a heat-radiation fin with a plurality of platy fin members is provided on a heat-conductive fixing member, by which the optical conversion plate is fixed to the optical component casing.

19. A rear projector, comprising:

an optical device that modulates a light beam irradiated by a light source to form an optical image in accordance with image information;

an image formation section including a projection optical system that projects the optical image in an enlarged manner;

a casing for housing the image formation section; and a screen provided on the casing in an exposed manner, on which the optical image formed by the image formation section is projected, the optical device comprising:

an optical modulator that modulates the light beam irradiated by the light source in accordance with the image information; and a color-combining optical device that combines the optical image formed by the optical modulator, wherein the optical modulator is housed in a holder frame having an opening formed corresponding to an image formation area of the optical modulator, wherein the holder frame housing the optical modulator therein, is fixed to a heat-conductive fixing member attached along a light-incident surface of the color-combining optical device, and wherein a heat-conductive member is provided extending between the holder frame and the fixing member by abutting on both of them.

20. The rear projector according to claim 19, further comprising:

an optical conversion plate having an optical conversion film that converts optical characteristics of the light beam entering the optical modulator of the optical device and a transparent member, on which the optical conversion film is attached; and an optical component casing, in which the optical device and the optical conversion plate are housed, wherein a heat-radiation fin with a plurality of platy fin members is provided on a heat-conductive fixing member, by which the optical conversion plate is fixed to the optical component casing.

\* \* \* \* \*